United States Patent
Greenwood et al.

(10) Patent No.: US 11,442,818 B2
(45) Date of Patent: Sep. 13, 2022

(54) PRIORITIZED LEADERSHIP FOR DATA REPLICATION GROUPS

(71) Applicant: Amazon Technologies, Inc., Seattle, WA (US)

(72) Inventors: Christopher Magee Greenwood, Seattle, WA (US); Divya Ashok Kumar Jain, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 202 days.

(21) Appl. No.: 16/729,899

(22) Filed: Dec. 30, 2019

(65) Prior Publication Data

US 2020/0133793 A1    Apr. 30, 2020

Related U.S. Application Data

(63) Continuation of application No. 15/199,635, filed on Jun. 30, 2016, now Pat. No. 10,521,311.

(51) Int. Cl.
*G06F 11/14*   (2006.01)
*G06F 16/2457*   (2019.01)

(52) U.S. Cl.
CPC ...... *G06F 11/1464* (2013.01); *G06F 11/1448* (2013.01); *G06F 16/24578* (2019.01)

(58) Field of Classification Search
None
See application file for complete search history.

(56) References Cited

U.S. PATENT DOCUMENTS

| | | |
|---|---|---|
| 5,909,540 A | 6/1999 | Carter et al. |
| 6,374,241 B1 | 4/2002 | Lamburt et al. |
| 6,662,219 B1 | 12/2003 | Nishanov et al. |
| 7,039,773 B2 | 5/2006 | Hu et al. |
| 7,461,130 B1 | 12/2008 | AbdelAziz et al. |
| 7,711,820 B2 | 5/2010 | Sharma et al. |
| 7,937,482 B1 | 5/2011 | Vermeulen et al. |
| 8,135,775 B1 | 3/2012 | Anderson et al. |
| 8,301,600 B1 | 10/2012 | Helmick et al. |
| 8,572,031 B2 | 10/2013 | Merriman et al. |

(Continued)

OTHER PUBLICATIONS

Zhengyu Yang et al., "AutoReplica: Automatic Data Replica Manager in Distributed Caching and Data Processing Systems", IEEE 2016, 6 pages.*

(Continued)

*Primary Examiner* — Uyen T Le
(74) *Attorney, Agent, or Firm* — Davis Wright Tremaine LLP

(57) ABSTRACT

Data replication groups may be used to store data in a distributed computing environment. A data replication group may include a set of nodes executing a consensus protocol to maintain data durably. In order to increase efficiency and performance of the data replication group leadership and/or fitness information may be determined for each node of the set of nodes executing the consensus protocol. The fitness information may be based at least in part on information associated with computing resource in the distributed computing environment and one or more constraints on assignment of a role of master node in the data replication group. The master node may be responsible for advancing the data replication group.

20 Claims, 11 Drawing Sheets

(56) References Cited

U.S. PATENT DOCUMENTS

| | | | |
|---|---|---|---|
| 8,732,517 | B1 | 5/2014 | Stefani et al. |
| 8,818,954 | B1 | 8/2014 | Bergant et al. |
| 8,843,441 | B1 | 9/2014 | Rath et al. |
| 8,856,593 | B2 | 10/2014 | Eckhardt et al. |
| 8,868,514 | B2 | 10/2014 | Lomet et al. |
| 8,965,849 | B1 | 2/2015 | Goo |
| 9,047,246 | B1 | 6/2015 | Rahut |
| 9,047,331 | B2 | 6/2015 | Rao et al. |
| 9,069,827 | B1 * | 6/2015 | Rath ............... G06F 16/273 |
| 9,223,843 | B1 | 12/2015 | Madhavarapu et al. |
| 9,230,000 | B1 | 1/2016 | Hsieh et al. |
| 9,317,576 | B2 | 4/2016 | Merriman et al. |
| 9,489,434 | B1 | 11/2016 | Rath |
| 9,552,242 | B1 | 1/2017 | Leshinsky et al. |
| 9,569,513 | B1 | 2/2017 | Vig et al. |
| 9,639,589 | B1 | 5/2017 | Theimer et al. |
| 9,805,108 | B2 | 10/2017 | Merriman et al. |
| 10,152,499 | B1 * | 12/2018 | Wilton ............ G06F 16/219 |
| 10,171,629 | B2 | 1/2019 | Bute et al. |
| 10,489,230 | B1 | 11/2019 | Chen et al. |
| 2002/0161889 | A1 | 10/2002 | Gamache et al. |
| 2004/0263152 | A1 | 12/2004 | Ahrikencheikh |
| 2005/0005200 | A1 | 1/2005 | Matena et al. |
| 2006/0020634 | A1 | 1/2006 | Huras et al. |
| 2006/0187906 | A1 | 8/2006 | Bedi et al. |
| 2006/0218204 | A1 | 9/2006 | Ofer et al. |
| 2007/0156842 | A1 | 7/2007 | Vermeulen et al. |
| 2007/0299955 | A1 | 12/2007 | Hoffman et al. |
| 2009/0049240 | A1 | 2/2009 | Oe et al. |
| 2010/0274768 | A1 | 10/2010 | Wang et al. |
| 2011/0251997 | A1 | 10/2011 | Wang et al. |
| 2011/0307886 | A1 | 12/2011 | Thanga et al. |
| 2012/0011398 | A1 | 1/2012 | Eckhardt et al. |
| 2012/0117229 | A1 | 5/2012 | Van Biljon et al. |
| 2012/0197868 | A1 | 8/2012 | Fauser et al. |
| 2013/0110774 | A1 | 5/2013 | Shah et al. |
| 2013/0290249 | A1 | 10/2013 | Merriman et al. |
| 2014/0032506 | A1 | 1/2014 | Hoey et al. |
| 2014/0136896 | A1 | 5/2014 | Tak et al. |
| 2014/0172944 | A1 | 6/2014 | Newton et al. |
| 2014/0337393 | A1 | 11/2014 | Burchall et al. |
| 2015/0169417 | A1 | 6/2015 | Brandwine et al. |
| 2015/0186229 | A1 | 7/2015 | Bortnikov et al. |
| 2015/0347548 | A1 | 12/2015 | Mortensen et al. |
| 2015/0372389 | A1 | 12/2015 | Chen et al. |
| 2016/0018992 | A1 * | 1/2016 | Takamura ......... G06F 3/0683 711/165 |
| 2016/0147859 | A1 | 5/2016 | Lee et al. |
| 2016/0217377 | A1 * | 7/2016 | Senarath ......... G06F 16/9537 |
| 2017/0004317 | A1 | 1/2017 | Bumbulis |
| 2017/0270176 | A1 | 9/2017 | Horowitz et al. |
| 2017/0366451 | A1 | 12/2017 | Schreter |
| 2017/0366619 | A1 | 12/2017 | Schreter |
| 2017/0371567 | A1 | 12/2017 | Piduri |

OTHER PUBLICATIONS

Jason Baker "Megastore: Providing Scalable, Highly Available Storage for Interactive Services", 5th Biennial Conference on Innovative Data Systems Research (CIDR '11) Jan. 9-12, 2011, Asilomar, California, USA. 12 pages.*

Abadi, "Consistency Tradeoffs in Modern Distributed Database System Design," Computer 45(2):37-42, Feb. 2012.

Bernstein, "Rethinking Eventual Consistency," Proceedings of the 2013 ACM SIGMOD International Conference on Management of Data, Jun. 22-27, 2013, 5 pages.

Chandy et al., "Distributed Snapshots: Determining Global States of Distributed Systems," ACM Transactions on Computer Systems 3(1):63-75, Feb. 1985.

Chen et al., "Replication Group Pools for Fast Provisioning," U.S. Appl. No. 14/954,928, filed Nov. 30, 2015.

Decandia et al., "Dynamo: Amazon's Highly Available Key-value Store," ACM SIGOPS Operating Systems Review 41(6):205-220, Oct. 14, 2007.

Dhoolam et al., "Node Placement for Replication Groups," U.S. Appl. No. 15/264,479, filed Sep. 13, 2016.

Dwork et al., "Consensus in the presence of partial synchrony," Journal of the Association for Computer Machinery 35(2):288-323, Apr. 1, 1988.

Gilbert et al., "Brewer's Conjecture and the Feasibility of Consistent, Available, Partition-Tolerant Web Services," ACM SIGACT News 33(2):51-59, Jun. 1, 2002.

Gray et al., "Leases: An Efficient Fault-Tolerant Mechanism for Distributed File Cache Consistency," ACM SIGOPS Operating Systems Review 23(5):202-210, Dec. 3-6, 1989.

Lamport et al., "Cheap Paxos," International Conference on InDependable Systems and Networks, Jun. 28, 2004, 9 pages.

Lamport, "Paxos Made Simple," Microsoft Research, http://research.microsoft.com/en-us/um/people/lamport/pubs/paxos-simple pdf [retrieved Aug. 22, 2016], 2001, 14 pages.

Letia et al., "CRDTs: Consistency without concurrency control," Rapport de recherche 6956, Jun. 2009, 13 pages.

MacCormick et al., "Niobe: A Practical Replication Protocol," Microsoft Research, https://www.microsoft.com/en-us/research/wp-content/uploads/2007/08/tr-2007-112.pdf [retrieved Aug. 22, 2016], 2007, 42 pages.

Peleg et al., "The Availability of Quorum Systems," Information and Computation 123(2):210-223, Dec. 1, 1995.

Trencseni et al., "PaxosLease: Diskless Paxos for Leases," Cornell University Library, http://arxiv.org/pdf/1209.4187.pdf [retrieved Aug. 22, 2016], 2012, 9 pages.

Wikipedia, "Ford-Fulkerson Algorithm," Wikipedia, The Free Encyclopedia, Aug. 9, 2016, https://en.wikipedia.org/wiki/Ford%E2%80%93Fulkerson_algonthm [Retrieved Aug. 29, 2016], 5 pages.

Wikipedia, "Maximum flow problem," Wikipedia, The Free Encyclopedia, Aug. 22, 2016, https://en.wikipedia.org/wiki/Maximum_flow_problem [Retrieved Aug. 29, 2016], 11 pages.

Wikipedia, "Paxos (computer science)," Wikipedia, the Free Encyclopedia, page last edited Jun. 5, 2017 [retrieved Jun. 6, 2017], https://en.wikipedia.org/w/index.php?title=Paxos_(computer_science) &oldid=783901344, 19 pages.

* cited by examiner

PRIORITIZED LEADERSHIP FOR DATA REPLICATION GROUPS

CROSS-REFERENCE TO RELATED APPLICATION

This application is a continuation of U.S. patent application Ser. No. 15/199,635, filed Jun. 30, 2016, entitled "PRIORITIZED LEADERSHIP FOR DATA REPLICATION GROUPS," the disclosure of which is incorporated herein by reference in its entirety.

BACKGROUND

Organizations invest in technologies that provide customers with access to computing resources. Such services provide access to computing and/or storage resources (e.g., storage devices providing either a block-level device interface, or a web service interface) to customers or subscribers. Within multi-tier ecommerce systems, combinations of different types of resources may be allocated to customers and/or their applications, such as whole physical or virtual machines, CPUs, memory, network bandwidth, or I/O capacity. Block-level storage devices implemented as a storage service may be made accessible, for example, from one or more physical or virtual machines implemented by another service.

Computer systems that provide services to customers may employ various techniques to protect the computer systems from a number of service requests that could potentially overload the computer systems. Furthermore, these computer systems may also employ various techniques to preserve customer data and customer experience during periods when the computer systems are overloaded or even experiencing failures. In general, a computer system is considered to be in an "overloaded" state if it is not able to provide the expected quality of service for at least some portion of customer requests it receives. Common solutions applied by overloaded computer systems include denying service to customers. In addition to this "overloaded" scenario, computer systems may also experience failure, including critical failure, power failure, or network failure.

To protect customer data against failures, customer data is often replicated across different computer systems. However, creating consistent replicas of customer data across a plurality of computer systems requires additional resources and requires consensus on customer data across the plurality of computer systems. Additionally, there is increased cost and time required to provision computer systems to maintain replicas of customer data. While such systems may maintain the integrity of customer data and mitigate the risk of loss, there may be a reduction in customer experience and delay in customers obtaining their data.

BRIEF DESCRIPTION OF THE DRAWINGS

Various techniques will be described with reference to the drawings, in which.

DETAILED DESCRIPTION

Figure 1:
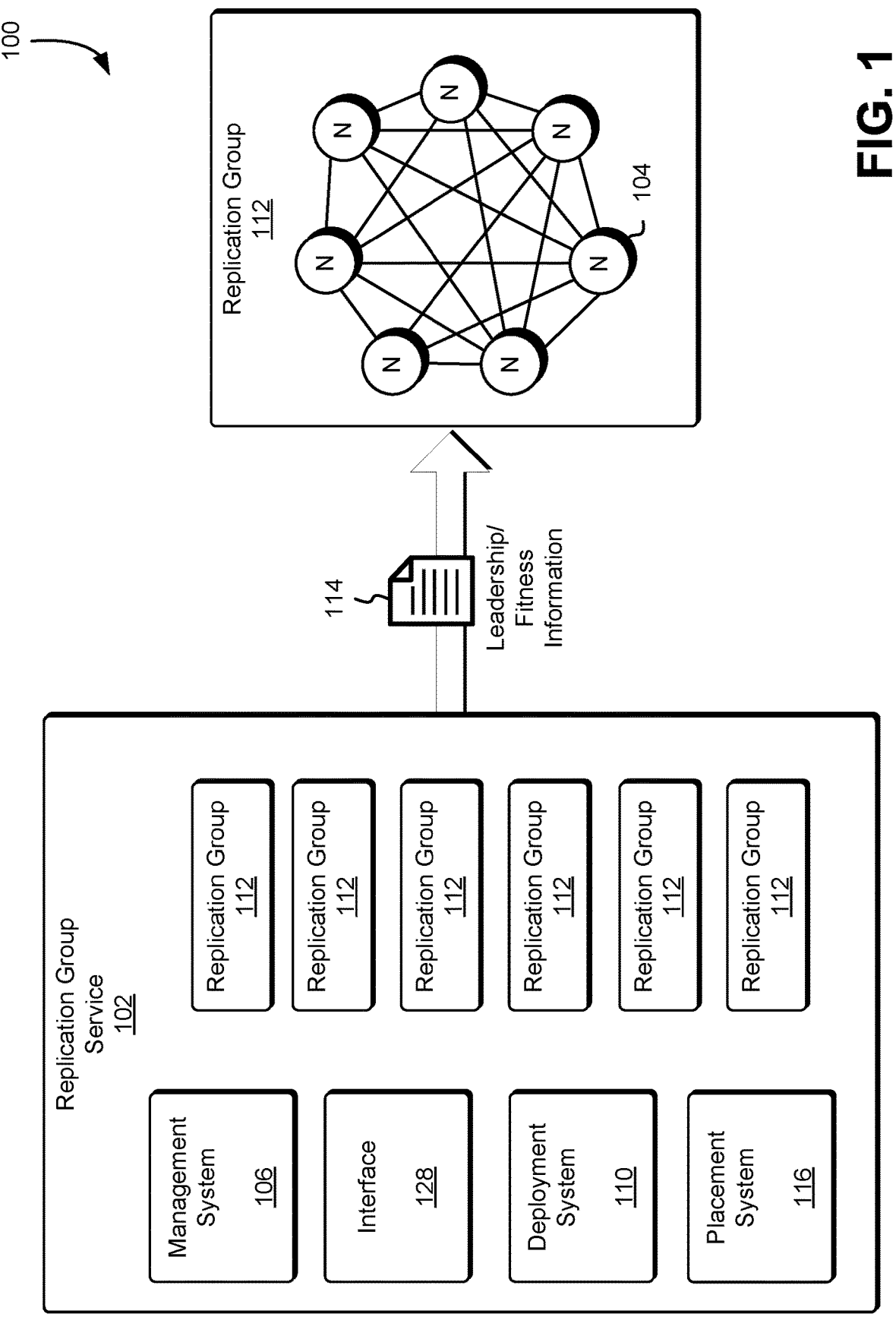
FIG. 1 illustrates an environment in which replication group service may determine leadership information for nodes of a data replication group fleet in accordance with an embodiment.

In various examples described below, leadership and/or fitness information is provided to data replication nodes of a data replication group to aid in or bias the selection of a master data replication node of the data replication group. In distributed computing systems, data replication reduces the risk of failure and mitigates possible data loss in the case of system failure. In various embodiments described herein, a data replication group maintains metadata associated with a master-slave volume pair. In addition, due to the distrusted nature of the computing systems it may be advantageous to have the master data replication node closer (e.g., fewer network hops) the master-slave volume pair. For example, during the unlikely events of network delay, power outage, or other impairment, having the master data replication node closer to the master-slave volume pair may avoid any outage caused by the impairment.

A data replication group may consist of some number of nodes executed by one or more host computer systems, where the nodes implement a consensus protocol, such as Paxos, to enable consistent data replication between the nodes. In general, implementing the consensus protocol by the data replication groups involves the nodes' election of a master node. In various protocols the master node may also be referred to as a leader, proposer, distinguished leader, distinguished proposer, or other such delineation indicating the role and/or responsibility of the node (e.g., the node responsible for progressing the algorithm). As described above, the data replication group may be associated with a particular computer system or storage system and may maintain the current state of that system. Progression of the algorithm would therefore include receiving and recording updates to the current state of that system. In another example, the data replication group may be associated with a particular customer and may begin storing data on behalf of the customer, progressing the algorithm would therefore include receiving and recording data on behalf of the customer.

To provision data replication groups in this manner, leadership information (e.g., a ranking of nodes where the highest ranked node should be elected master node first) and/or fitness information (e.g., a fitness score associated with a particular node) is provided to the nodes. This leadership and/or fitness information may be determined based at least in part on a location of the various nodes relative to particular computing resources in the distributed computing environment. Additionally, the data replication group may be initialized but the data replication group may not accept traffic until it is assigned and/or associated with a computer system or service. Furthermore, a particular node may be a member of a plurality of data replication groups. For example, a placement service may determine host computer systems that may implement a node of a data replication group and the number of data replication groups the node may be a member of. Once a request for allocation of a data replication group is received, the data replication group may be selected and associated with the computer system or service the data replication group is to support. The selected data replication group may then begin receiving traffic and may, if a master node has not already been determined, determine a master node of the data replication group based at least in part on the leadership and/or fitness information.

The placement service may determine the leadership and/or fitness information based at least in part on a fitness function and host system configuration information of the distributed computing environment. The placement service may maintain host system configuration information including information indicating the location of various data centers, network topologies, network boundaries, network devices, server location, power zone, fault zone, physical boundaries, and other information useable for determining the location of various computing resources. The placement service attempts to optimize the location of the master node based at least in part on various constraints on location of the master node. The constraints may include the locality of the nodes to each other, locality of the nodes to the computing systems supported by the data replication group, the locality of particular nodes (e.g., the master node) to the computing systems supported by the data replication group, the locality of particular nodes to other nodes, or other constraints on location that may optimize the execution of the consensus algorithm. As described in greater detail below, the placement service provides the nodes of a data replication group with information indicating the fitness of each node to be a master for the data replication group. This information may change or be updated over various time intervals or based at least in part on the placement or movement of various computing resources.

In the preceding and following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

FIG. 1 illustrates an environment 100 in which a computing resource service provider may operate a replication group service 102 (also referred to as a replication service 102 for short) configured to manage one or more data replication groups 112. The nodes 104 of the data replication group 112 may store copies or replicas of data so as to provide redundancy in the event of the loss of some number of nodes 104. The replication service 102 may be configured as a clustered storage system for storing customer data, metadata about customer data, or other data across a plurality of physical hosts. Such a clustered storage configuration may reduce the risk of failure and increase availability of the data replication groups 112 or particular nodes of the data replication groups 112 during network connection events and/or network connection issues. For example, the number of nodes 104 of the data replication group 112 may be selected such that the probability of a majority of the nodes 104 of the data replication group 112 failing is below some threshold.

The replication service 102 may maintain a plurality of data replication groups 112; in turn, each data replication group 112 may consist of a plurality of nodes 104. The data replication groups 112 may include replicated state machines or other storage systems configured to store data in a distributed computing environment. In various embodiments, each node 104 is a process, executed by a host computer system or other computer system, described in greater detail below, which participates in one or more data replication groups 112. For example, for a particular data replication group implementing the Paxos consensus protocol, each node 104 of the data replication group 112 may implement one or more roles of the Paxos consensus protocol such as the role of acceptor, proposer, and/or learner. In addition, the Paxos consensus protocol executed by the nodes 104 may include a master node described in greater detail below. The master node may be a role assigned to a single node of the data replication group 112 and may be responsible for managing certain aspects of the Paxos consensus protocol. In this manner, the nodes 104 of the data replication group may be responsible for the durability of customer data or other data maintained by the data replication group 112.

The Paxos consensus protocol may include a family of different protocols configured to solve consensus issues in a network of unreliable processors (e.g., computer systems and networks that are subject to possible failures). The Paxos consensus protocol ensures agreement on one result and/or one operation among a group of participants, for example, the nodes 104 of the data replication group 112. The Paxos consensus protocol may be used by replication service 102 and the data replication groups 112 to implement state machine replication and/or data replication in a distributed computing environment, such as the environment 100 illustrated in FIG. 1. The Paxos consensus protocol may define the set of actions which may be performed by the nodes 104 of the data replication groups 112 according to one or more predefined roles included in the Paxos consensus protocol: client, acceptor, proposer, learner, and master. In some embodiments, a single node of a particular data replication group may implement one or more roles at any given time. For example, a particular node may be a master, acceptor, and learner in accordance with the Paxos consensus protocol.

A client, which may include a computer system under the control of a customer of the computing resource service provider and/or application or other executable code executed by one or more other computer systems or services of the computing resource service provider, may issue requests to the data replication group 112 and/or replication service 102 and wait for a response. For example, the client may include a customer transmitting a storage request to an interface 128 of the replication service 102. The interface 128 may include a web-services front end or other computer system interface configured to receive an application program interface (API) request and process the API request and/or direct the API request to an appropriate computer system or service for processing. In another example, the client may include another service of the computing resource service provider issuing a request to store state information of the other service on behalf of a customer. The interface 128 may also accept requests for other components of the replication service 102 such as the management system 106, a placement system 116, or a deployment system 110. For example, the interface 128 may receive a request and/or command to update software executed by the nodes 104 or host computer server executing the nodes 104 and direct the request to the deployment system 110 described in greater detail below. In another example, the interface 128 may receive a request for leadership and/or fitness information 114, described in greater detail below, from one or more nodes 104 of the replication group.

Returning to the example above, in accordance with the Paxos protocol, acceptors implemented by one or more nodes 104 of a data replication group 112 may be collected or assembled into groups, collectively referred to as quorums. In various embodiments, a quorum includes a majority of the nodes 104 of the data replication group 112. In various embodiments of the Paxos protocol, any message sent to an acceptor must be sent to the quorum of acceptors and any message received from an acceptor is ignored unless a copy is received from each acceptor in the quorum. A proposer, when implemented by a node 104 of the data replication group 112, may transmit proposals to acceptors, a proposal may include a message attempting to reach an agreement on a value and/or action by the acceptors. A learner, when implemented by a node 104 of the data replication group 112, may perform some action once an agreement is reached (e.g., transmit a response to the client). Finally, a master, when implemented by a node 104 of the data replication group 112, may perform actions to advance the nodes 104 of the data replication group 112.

In general, any protocol that satisfies the consensus requirements of the replication service 102 and data replication groups 112 may be implemented in accordance with the embodiments described herein. Furthermore, in some embodiments, additional constraints may be placed on the consensus protocol implemented by the replication service 102 and data replication groups 112 as required. For example, the replication service 102 and data replication groups 112 may require the implemented consensus protocol to allow for the addition of a new member and/or node 104 to the data replication group 112 at some point in time after the initialization of the data replication group 112.

Additionally, the number of nodes 104 in the data replication group 112 may vary depending on the latency and durability requirements of the customer, other services of the computer system, or replication service 102. For example, the number of nodes 104 in the data replication group 112 may be reduced if a particular service and/or customer requires reduced latency and response time. In contrast, if a customer and/or service requires higher fault tolerance and data durability, the number of nodes 104 in the data replication group 112 may be increased. A management system 106 of the replication service 102 may be responsible for determining the number of nodes 104 in a particular data replication group. The management system 106 may be a process or other application executed by a host computer system.

Furthermore, the management system 106 may be responsible for creation, termination, and assignment of the data replication groups. For example, the management system 106 may determine that a new data replication group is to be created and may communicate with one or more other services (not shown in FIG. 1 for simplicity) of the computing resource service provider in order to create the new data replication group. The process of creating new data replication groups is described in greater detail below. The management system 106 may also be responsible for assigning and/or associating a particular data replication group to a customer or deployment group. For example, the management system 106 may map a particular data replication group or address of the particular data replication group to a customer such that the particular data replication group may receive traffic from or on behalf of the customer. In another example, the management system 106 may determine a number of host computer systems included in one or more deployment groups to execute nodes 104 of the data replication group.

The placement system 116 may be a process or application executed by a host computer system. In addition, the placement system 116 may monitor and determine the placement of nodes 104 and data replication groups 112 in a distributed computing environment as described in greater detail below in connection with FIG. 3. For example, the placement system 116 may attempt to determine a set of host computer systems to implement the nodes 104 such that a fault or error of a particular computing resource (e.g., router, server, power source, or top of rack switch) does not prevent a quorum on nodes 104 from communicating. The placement system 116 may monitor and store information indicating the location of various computing resources and nodes 104 (e.g., particular computing resources implementing the nodes 104) in the distributed computing environment. This information may enable the placement system to determine leadership and/or fitness information 114 for the nodes 104 of the data replication groups 112.

For example, the leadership and/or fitness information 114 may cause the master node to be selected such that the master node and a quorum of nodes 104 are executed by the same host computer system. In this manner, the failure of a computing resource outside the host computer system may not prevent the data replication group 112 from operating. In another example, if the majority of the nodes 104 or the master node is unavailable, then the data replication group 112 is not able to operate properly and progress of the Paxos consensus protocol cannot be made. Progress may include updating and/or storing additional information in the nodes 104. For example, the nodes 104 may store information indicating the location of volume partitions such as partitions in a master-slave volume pair. In such an example, progress of the Paxos consensus protocol requires that the nodes 104 may update and/or record modifications to the master-slave volume pair (e.g., movement of a volume from a first host computer system to a second host computer system).

To avoid placement of nodes 104 in such a manner that failure of a particular computing resource causes a failure of the data replication group 112, a weighting algorithm or a fitness function is used to determine leadership and/or fitness information 114 for each node 104 of the data replication group 112. The leadership and/or fitness information 114 may indicate a particular node of the data replication group 112 to be the master node or may indicate a preference or bias for a certain node or nodes to be the master node. For example, the leadership and/or fitness information 114 may indicate an order of nodes to attempt to assign the role of master node first. In another example, the leadership and/or fitness information 114 may provide a value (e.g., a value between 0 and 1) for each node of the data replication group 112, the value may indicate a preference or fitness (e.g., the higher the value the greater the preference or fitness) of a particular node to be assigned the role of master node.

An example fitness score determined by the placement system 116 and transmitted to the nodes 104 as the leadership and/or fitness information 114 include the geometric mean of a set of features. The range of the geometric mean may be zero to one and may be calculated by taking the nth root of the product of all or a portion of the set of features. In an embodiment, the set of features includes network distance, node resource consumption, node proximity to other nodes, and node health. Network distance may be determined by dividing one by the number of network hops between a particular node (e.g., the node for which the fitness score is being calculated) and a computing resource supported by the data replication group 112 of which the particular node is a member. The network distance feature then decreases as the number of network hops between the particular node and the computing resource supported by the data replication group increase. The node resource consumption may be determined by subtracting a percentage value from one, where the percentage value represents an amount of the total computing resources (e.g., a number of input/output operations per second) of a server computer consumed by the particular node over an interval of time (e.g., the last hour). As a result the node resource consumption may decrease as the particular node receives more traffic from other data replication groups. The node proximity to other nodes feature may be determined by subtracting the number of nodes 104 of the data replication group 112 with N number of network hops to the particular node. The node health feature may be determined based at least in part on whether the particular node has failed one or more diagnostics tests over an interval of time (e.g., the last 3 days).

In addition, the leadership and/or fitness information 114 may indicate an adherence level. The adherence level may indicate how closely the leadership and/or fitness information 114 must be followed. For example, if the nodes 104 of the data replication group 112 are distributed over a large number (e.g., large relative to the number of nodes 104 in the data replication group) of fault zones, adherence to the leadership and/or fitness information 114 may ensure operability of the data replication group 112 during a failure in one or more fault zones. Similarly, if the nodes 104 in the data replication group are local (e.g., a quorum of nodes 104 are within a single fault zone) then operability of the data replication group 112 may be maintained even in the event of a failure of the master node, and the requirement of adherence to the leadership and/or fitness information 114 may be reduced.

Furthermore, the placement system 116 may determine the leadership and/or fitness information 114 based at least in part on the location of various computing resources. Returning to the example above, the placement system 116 determines the location of the master and the slave partitions and determines the leadership and/or fitness information 114 such that the node with the highest value and/or preference to be assigned the role of master node is located closest (e.g., fewest network hops) to the master partition. Other locations and distance measure may be used to determine the placement of the master node indicated in the leadership and/or fitness information 114, for example, a location within the same data center or region, a location closer to or further from a particular computing resource, a distance measure based at least in part on physical location, a distance measure based at least in part on power configurations, or other mechanisms for determining location and distance in a distributed computing environment. Network distance may not only be measured based at least in part on network topologies (e.g., number of network hops) but may also be determined based at least in part on an age and/or reliability of particular networking devices. For example, if a first node is behind an older or less reliable router, the placement system 116 may determine the first node is a greater distance (e.g., network distance) then a second node behind a newer and more reliable router. The placement system 116 may use other mechanisms in addition to or besides distance to account for different computing resources. For example, the placement system 116 may weight certain computing resources when determining the leadership and/or fitness information 114.

The deployment system 110 may be a process or other application executed by a host computer system. Furthermore, the deployment system 110 may be responsible for maintaining a plurality of deployment groups and distributing deployments to one or more host computer systems executing one or more nodes 104 of the data replication group 112. The nodes 104 of the data replication group 112 may be distributed across a plurality of host computer systems such that no one host computer system executes a quorum of the nodes 104 of a particular data replication group. Deployments may include any software deployment or other distribution of executable code configured to install and/or update software of a host computer system or other computer systems capable of executing the source code associated with the software. Software deployment may include all of the activities that make a software system available for use. The general deployment process may consist of several interrelated activities with possible transitions between them. These activities can occur at the software developer side, client side, or both. Various different deployments and deployment activities may be utilized in accordance with the present disclosure. The deployment system 110 may manage various deployment activities such as preparing a deployment for release to the host computer systems, installing and activating the executable content included in the deployment, version tracking, updating, uninstalling, and various other activities suitable for deploying software to hosts.

In various embodiments, the host computer systems may be initialized and configured to execute a certain number of nodes 104 of one or more data replication groups 112. These host computer systems may be available and idle until the replication service 102 determines to utilize the resources of the host computer system. For example, when the replication service 102 receives a request for a data replication group, the replication service 102 or component thereof, such as the management system 106, may select host computer systems to implement nodes 104 of the data replication group 112 based at least in part on an evenness criteria described in greater detail below.

Figure 2:
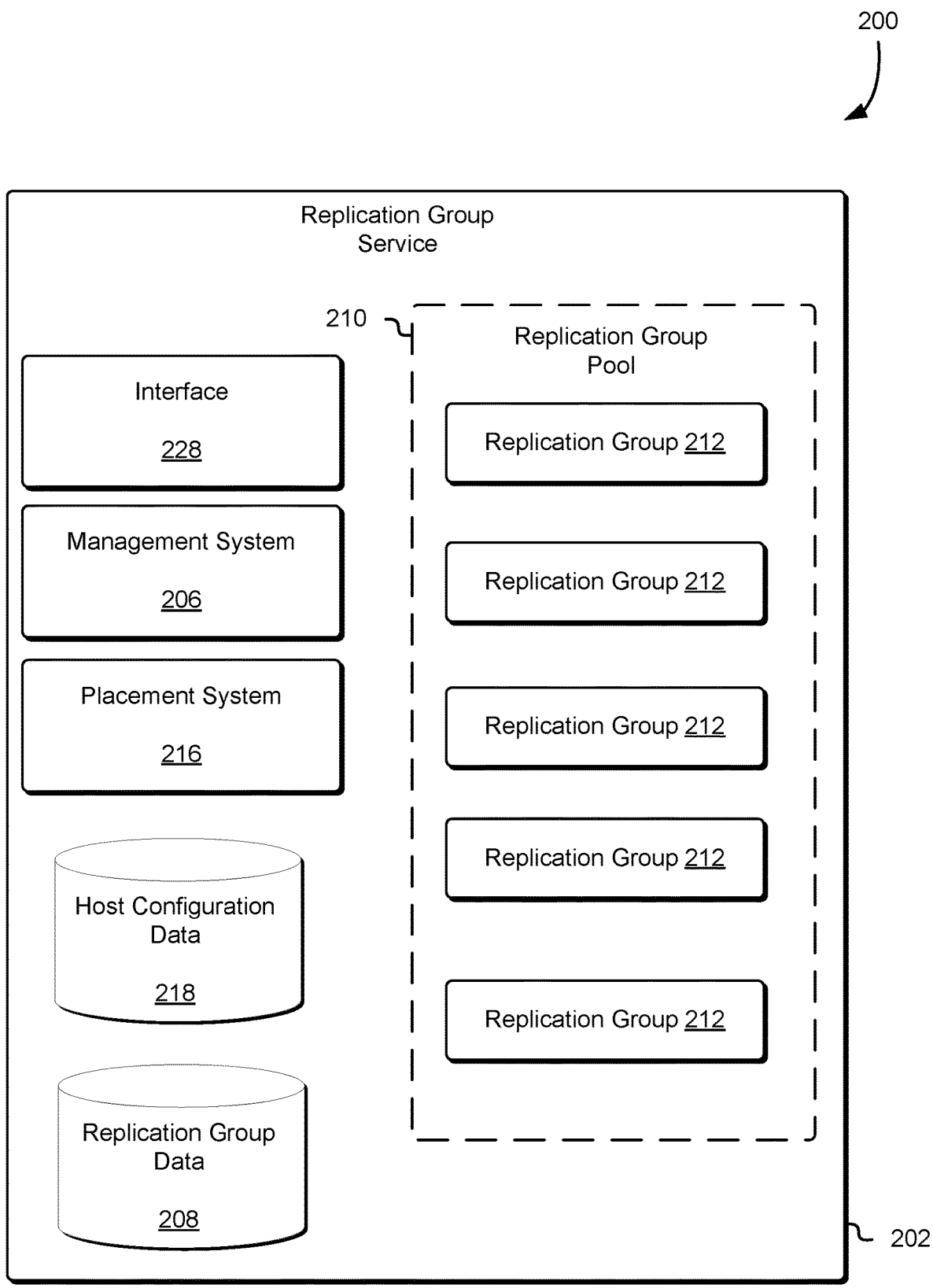
FIG. 2 illustrates an environment in which replication group service may determine leadership information for nodes of a data replication group fleet in accordance with an embodiment.

FIG. 2 illustrates an environment 200 in which a computing resource service provider may operate a replication group service 202 configured to manage one or more data replications groups 212 in a replication group pool 210 (also referred to as pool 210) of data replication groups 212. Provisioning a data replication group 212 such that it may implement a consensus protocol and begin to receive traffic may increase latency or violate the terms of a service-level agreement (SLA). An SLA may be part of a service contract or other agreement between a computing resource service provider and a customer where a particular service is formally defined.

Particular aspects of the service (e.g., scope, quality, responsibilities, latency, and availability) may be agreed on between the computing resource service provider and the customer. The pool 210 of data replication groups 212 may enable the computer resource service provider to achieve a predefined level of performance as indicated in a particular SLA. The pool 210 of data replication groups 212 may enable replication group service 202 to asynchronously respond to a request for data replication groups 212 and provision new data replication groups 212. In addition, the data replication groups 212 may be optimized such that particular node of the data replication group 212 is assigned the role of master node to achieve a predefined level of performance as indicated in a particular SLA.

In addition, there may be application and/or service that requires reduced latency when provisioning a particular data replication group 212 to receive traffic on behalf of the application or service. For example, a customer application may require the creation of a data replication group 212 for storage of customer data in a shorter time interval relative to an amount of time required to provision a data replication group 212. In order to achieve lower latency as may be required, a pool 210 of data replication groups 212 may be created such that fully functional data replication groups 212 are available when required without the need of provisioning a new data replication group 212. As described above, the replication group service 202 may include an interface 228, management system 206, and a placement system 216. In addition, the replication group service 202 may maintain replication group data 208 and host configuration data 218.

Furthermore, although all of the data replication groups 212 illustrated in FIG. 2 are members of the pool 210, other configurations of data replication groups 212 and pools 210 are within the scope of the present disclosure. For example, the replication group service 202 may maintain one or more data replication groups 212 outside of or aside from the pool 210 of data replication groups 212. In another example, the replication group service may maintain a plurality of pools 210. The pools 210 may be distributed across regions, geographic boundaries, physical boundaries, fault zones, power zones, or other logical groupings of computing resources in a distributed computing environment. As describe above, a preference for a particular master node for each data replication group 212 in the pool 210 may be indicated by the placement system 216. In various embodiments, when determining a new master node the node of the data replication group may request information from the placement system 216, indicating one or more nodes of the data replication group's fitness and/or preference to be assigned the role of new master node.

The replication group service 202 may further include replication group data 208. Replication group data 208 may consist of data corresponding to the data replication groups 212, nodes of the data replication groups, customers or services mapped to the data replication groups 212, and any such other data as required by the management system 206 and/or replication group service 202. The replication group data 208 may be maintained in a database of other data stores such that the data is accessible and/or queryable by other components of the replication group service 202, customer, or other services. In one example, replication group data 208 may maintain data to aid in discovery of nodes by one or more other nodes of the data replication groups 212. This data may include a mapping of data replication groups 212 identification information to nodes of the data replication group. Furthermore, the data may include information about particular nodes and/or roles of the particular nodes. For example, an input/output (I/O) request may be received at the interface 228 of the replication group service 202. The I/O request may indicate a particular data replication group 212, the replication group service 202 or component thereof, and may query the replication group data 208 in order to determine a leader or other node of the data replication group 212 designated to receive the I/O request.

In various embodiments, the placement system 216 may determine replication group data 208 such as aggregate fitness information for the data replication groups 212 based at least in part on leadership and/or fitness information for various nodes in the data replication groups 212. In addition, the aggregate fitness information for the data replication groups 212 based at least in part on the information used to determine the leadership and/or fitness information for the various nodes in the data replication groups 212. The aggregate fitness information may be determined based at least in part on a function of the leadership and/or fitness information for various nodes in the data replication groups 212. For example, a weighted average may be used to determine the aggregate fitness information based at least in part on the leadership and/or fitness information and additional information associated with the nodes of the data replication group 212 such as the computing resources implementing the nodes or a location of the nodes. The aggregate fitness information for the data replication groups 212 may provide an indication of the overall health and/or performance of the pool 210 of data replication groups 212 or individual data replication groups 212. In addition, if the aggregate fitness information for the data replication groups 212 or a particular data replication group is below some threshold, the replication group service 202 may initiate procedures to improve the aggregate fitness information for the data replication groups 212. For example, the replication group service 202 may redistribute the nodes of the data replication group. In various embodiments, the aggregate fitness information and/or the leadership and/or fitness information is used to implement active placement of nodes of the data replication group 212 such that the replication group service 202 is continuously or at various points in time optimizing the placement of nodes of the data replication groups 212.

The data in the replication group data 208 may be updated at various intervals of time. For example, the management system 206 may query the nodes and/or data replication groups 212 in order to obtain information useable to update the replication group data 208. The replication group data 208 may also include information corresponding to the number of data replication groups 212 in the pool 210, a maximum number of data replication groups 212 to be included in the pool 210, and a frequency or number of requests for data replication groups 212 received by the replication group service 202. The replication group service 202 or component thereof may utilize this information to determine a rate at which data replication groups 212 are to be added to the pool 210. The process for adding data replication groups 212 to the pool 210 may include identifying a set of physical hosts suitable for hosting a new data replication group 212, initializing nodes on the set of physical hosts to be included in the new data replication group 212, initializing a consensus protocol among the nodes, providing leadership and/or fitness information to the nodes, validating the health of the data replication group 212, and updating the replication group data store to indicate that the new data replication group 212 is ready to receive traffic and is a member of the pool 210. Validating the health of a node and/or data replication group 212 may include a determination that the consensus protocol is executing correctly on the node and/or data replication group 212 and that an appropriate master node was assigned based at least in part on the leadership and/or fitness information. The consensus protocol may include a heartbeat or other messages exchanged between nodes of the data replication group 212 that indicate that a particular node is operating as expected. A data replication group 212 may be considered healthy if a majority of the nodes of the data replication group 212 are operating as expected (e.g., have successfully validated the health of the node).

The replication group service 202 may further include host configuration data 218. The host configuration data 218 may consist of information indicating the location of various computing resources in a distributed computing environment, network topology, power topology, and any such other data as required by placement system 216 and/or replication group service 202 to determine leadership and/or fitness information for various nodes of the data replication groups 212. The replication group data 208 may be maintained in a database of other data stores such that the data is accessible and/or queryable by other components of the replication group service 202, customer, or other services. In one example, the host configuration data 218 is maintain to enable the placement system 216 to determine suitable placement locations and determine leadership and/or fitness information for various nodes.

The data replication group 212 may be selected based at least in part on a variety of factors, such as the health of the data replication group 212, the time at which the data replication group 212 was created, a position of the data replication group 212 in a queue, attributes of the data replication group 212 (e.g., number of nodes, physical hosts implementing the nodes, location, latency, processing power, failure rate, fitness of a master node, etc.), a consensus protocol executed by the data replication group 212, and other factors that are suitable for selecting a particular data replication group 212 to fulfill a request. The selected data replication group 212 may then be associated with the new resource, customer, or other service responsible for submitting the request. At this point, the data replication group 2121 may be ready to receive requests and store data.

An asynchronous process and/or thread may then be triggered by the replication group service 202 or component thereof such as the management system 206 in order to replace the data replication group 212 removed from the pools 210. This process and/or thread may be executed at a point in time of removal of the data replication groups 212 from the pool 210 or may be triggered based at least in part on other factors. For example, the process and/or thread to add new data replication groups 212 to the pool 210 may be executed based at least in part on the expiration of an interval of time. In another example, the process and/or thread to add new data replication groups 212 to the pool 210 may be executed based at least in part on a request rate for data replication groups 212 received by the replication group service 202 or component thereof, such as the interface 228. When adding a new data replication group 212 to the pool, the placement system 216 may determine leadership and/or fitness information for the new nodes of the new data replication group 212. This may incorporate leadership and/or fitness information from previous data replication groups. For example, the placement system 216 may track active master nodes (e.g., master nodes of a data replication group that are assigned to and used by a customer or computing resource) and generate leadership and/or fitness information to avoid placing a certain number of active master nodes on the same host computer system.

Figure 3:
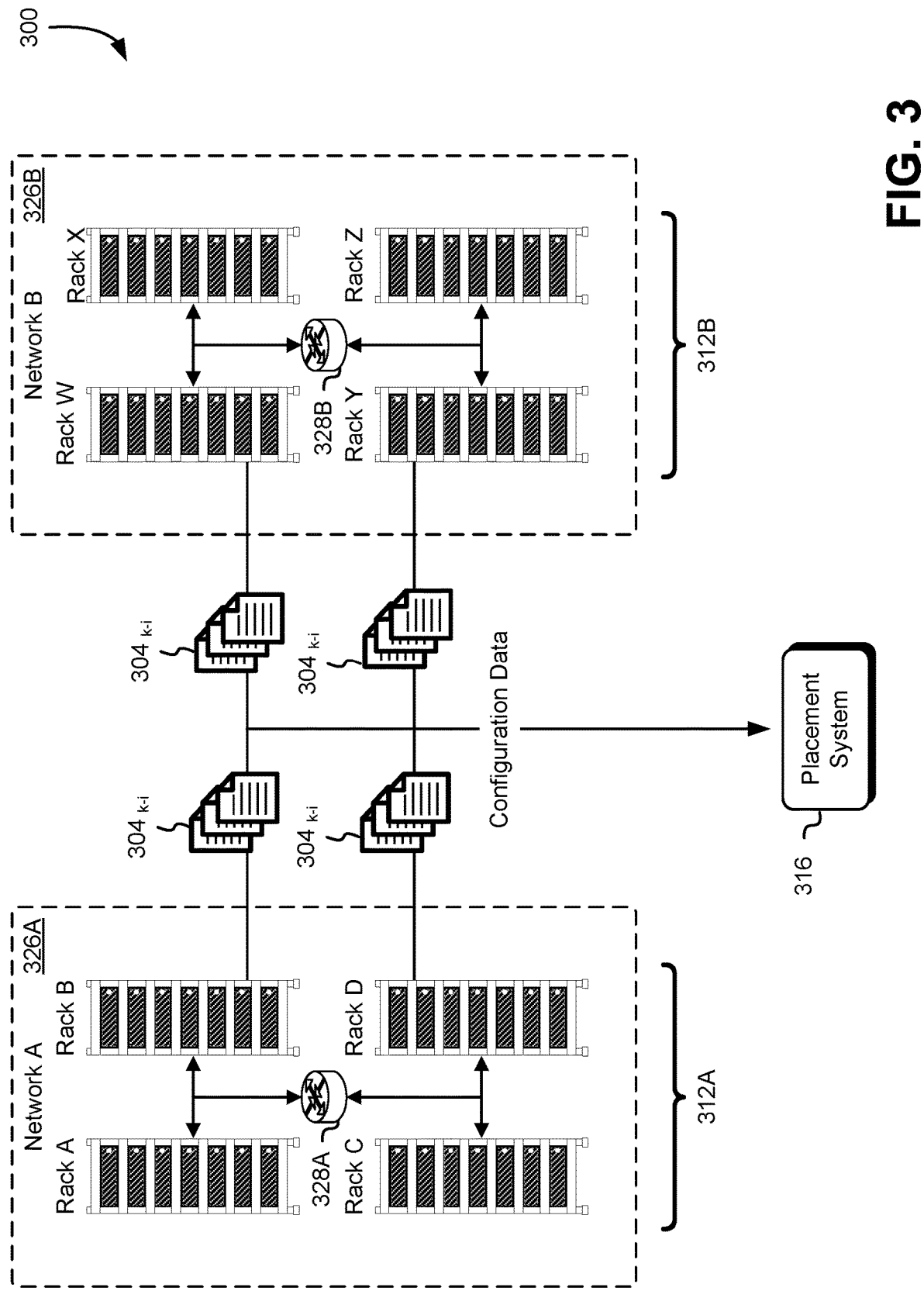
FIG. 3 illustrates an environment in which a placement system may obtain host configuration information for a set of data replication groups in accordance with an embodiment.

FIG. 3 illustrates an aspect of an environment 300 in which an embodiment may be practiced. Specifically, FIG. 3 depicts the collection and processing of configuration data 304 by a placement system 316 to enable the placement system 316 to generate leadership and/or fitness information for nodes executed by the servers in sets of racks 312A-312B. The environment 300 includes the placement system 316 that receives configuration data 304 from servers or other components of the sets of racks 312A-312B. The nodes may be placed on the servers according to a rack diversity constraint, hard constraints, soft constraints, and other constraints, where the sets of racks 312A-312B may be localized by different networks 326A-326B. The data collected by the placement system 316 may include various elements of the configuration data $304_{k-i}$ obtained from different servers in the sets of racks 312A-312B. For example, the data collected by the placement system 316 may include the location of various master-slave partition pairs or the number of nodes executed by a particular server in the sets of racks 312A-312B.

The placement system 316 may be software or executable code executed by the servers in the sets of racks 312A-312B or other computing resources to obtain configuration data $304_{k-i}$ generated by the servers in the sets of racks 312A-312B implementing nodes of the data replication groups as described above in conjunction with FIG. 1. The sets of racks 312A-312B may be physical hardware that hosts one or more servers or, in some embodiments, is simply a logical groupings of the one or more servers. Examples of logical groupings other than by rack may include servers grouped together based on data center location, servers in different fault isolation groups (i.e., logical divisions of resources such that failure of one fault zone may not affect servers in the other zones; e.g., grouped by geographic regions, data centers, hard drive clusters, backup generators, etc.), servers grouped together based on performance characteristics (e.g., throughput, input/output operations per second, etc.), and so on). The servers in a rack may be members of a particular network. In some implementations, multiple racks of servers may be members of the same network. For example, as illustrated in FIG. 3, the servers of the set of racks 312A share the network 326A. Likewise, the servers of the set of racks 312B share the network 326B.

The networks 326A-326B may be data communication pathways between one or more electronic devices. The networks 326A-326B may be wired or wireless networks and may use any of a variety of communications protocols for organizing their network traffic. The networks 326A-326B may allow the sharing of files, data, and other types of information between the one or more electronic devices accessible through the data communication pathways. Each of the networks 326A-326B may be associated with a router, such as an aggregation router that aggregates the servers of the respective set of racks into the common network, separate from the router associated with the other network. Each of the networks 326A-326B may be on a different subnet than the other network. For example, as illustrated in FIG. 3, the servers of the set of racks 312A may be commonly connected to a router 328A. Similarly, the servers of the set of racks 312B may be commonly connected to a router 328B. The routers 328A-328B may be networking devices that forward packets between computer networks, such as between the networks 326A-326B.

As described above, the placement system 316 may obtain configuration data $304_{k\text{-}i}$ and store the configuration data $304_{k\text{-}i}$ for use in determining leadership and/or fitness information. The placement system 316 may obtain the configuration data $304_{k\text{-}i}$ directly from the servers and computing resources located in the environment 300 or may obtain the configuration data $304_{k\text{-}i}$ computer systems and services responsible for managing the servers and computing resources located in the environment 300. For example, a placement service of a block-level storage service may place partitions of customer volumes on various service of the set of racks 312A-312B, the placement system 316 may query the placement service of the block-level storage service to obtain configuration information $304_{k\text{-}i}$ corresponding to the location of customer volumes.

Furthermore, the placement system 316 may also include a data warehouse or data storage system that stores the configuration data $304_{k\text{-}i}$ such that the configuration information $304_{k\text{-}i}$ may be queried. In this manner, the placement system may be able to query the configuration data $304_{k\text{-}i}$ for information as well as being provided information corresponding to the configuration data $304_{k\text{-}i}$ through a data stream or other mechanism for providing the data to the placement system 316. The placement system 316 may include logic, such as software or other executable code, configured to determine, based at least in part on the configuration data $304_{k\text{-}i}$, the placement of nodes of a data replication group that satisfies various soft constraints on locality. The soft constraints may include a set of rules that the placement system 316 will attempt to satisfy but will not provide an error if not satisfied. In addition, the locality of nodes may be determined relative to various different factors as described herein. For example, locality may be determined by network locality such as number of network hops between computing resources or being within the same network or subnetwork. In another example, locality may be determined by computing resources such as with the same rack of the set of racks 312A-312B or the same server.

The placement system 316 may attempt to achieve locality and diversity by at least generating the leadership and/or fitness information such that the number of soft constraints satisfied is maximized. For example, a first soft constraint may indicate that the master node should be executed within the same rack as a quorum of the nodes of a data replication group, and a second soft constraint may indicate that a first portion of the nodes should be executed on a network distinct from a second portion of the nodes. The placement system 316 may use a fitness function or fitness approximation to determine a value for a set of possible nodes and data replication groups based at least in part on the first and second soft constraint.

Figure 4:
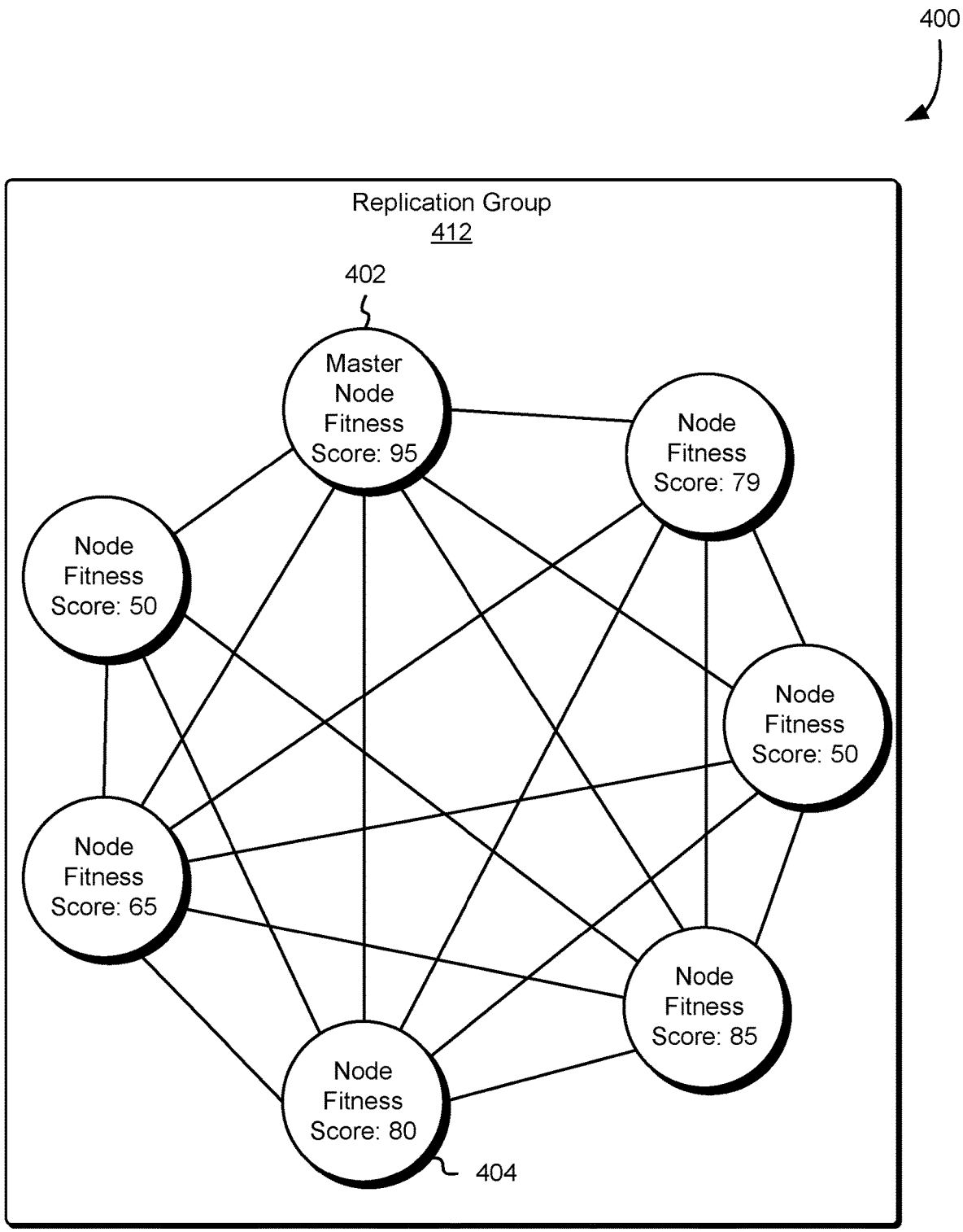
FIG. 4 illustrates configuration properties of a data replication group, including data replication group nodes with associated fitness information, which may be used for implementing various types of consensus protocols in accordance with an embodiment.

FIG. 4 illustrates an environment 400 in which a data replication group 412 may implement a consensus protocol between one or more nodes 404 in accordance with at least one embodiment. In addition, at least one node of the data replication group 412 may be a master node 402. Each node 404, including the master node 402, may be software or other executable code maintained in the memory of a physical host or other server computer system and executed by the physical host or other server computer system in order to provide the functionality described herein. Furthermore, the nodes 404 and master node 402 may be executed by one or more distinct physical hosts or other server computer systems. For example, two nodes 404 of the data replication group 412 may be executed by a first physical host and the remaining nodes 404, including the master node 402, of the data replication group 412 may be executed by a second physical host. The physical hosts may include a variety of computing resources such as the server computer systems described above in connection with FIG. 3.

The nodes 404 and master node 402 of the data replication group 412 may be connected (illustrated as a line between the nodes in FIG. 4) through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 404 and master node 402 may be distributed across physical hosts and networks such that failure of one or more networks or physical hosts does not cause all of the nodes 404 of the data replication group 412 to fail.

Although six nodes and one master node 402 are illustrated in FIG. 4, any number of nodes 404 and master nodes 402 may be included in the data replication group 412 and distributed across a plurality of distributed computer systems in accordance with the present disclosure. However, in some embodiments, only a single master node is included in the data replication group 412. This restriction may be required by the consensus protocol implemented by the data replication group 412 or may be a restriction enforced in order to increase efficiency and/or optimize execution of the data replication group 412. The master node 402 may be selected and/or determined from the set of nodes 404 in the data replication group 412 based at least in part a node fitness score as illustrated in FIG. 4. For example, the data replication group 412 may be initialized with seven nodes 404 and the master node 402 may be selected from the set of seven nodes based on the node fitness score provided to the seven nodes 404 by the placement system described in greater detail above.

As illustrated in FIG. 4, the node fitness score may be a value assigned to each node 404 indicating a determination by the placement system of the particular node's fitness to be the master node 402. Although a fitness score is illustrated in FIG. 4, any number of other mechanisms or combination of mechanisms may be used to indicate a particular node's fitness to be the master node 402. For example, the leadership and/or fitness information may, instead of or in combination with the fitness score illustrated in FIG. 4, provide a ranking or order for which the data replication group 412 is to attempt to assign the role of mater node. Specifically, the ranking may indicate a first node which will attempt to be elected and/or assigned the role of master node 402 first, and then a second node in case of failure of the first node to be elected and/or assigned the role of master node 402, and then a third node, etc.

In yet other embodiments, the fitness score is a value within a range (e.g., 0 to 1) determined based at least in part on a fitness function which may optimize the placement of the master node 402 based at least in part on various constraints. The fitness function may attempt to optimize a single objective or may attempt to optimize multiple objectives. For example, the fitness function may attempt to optimize the location of the master node 402 so that the master node 402 is closest to a particular computing resource associated with the data replication group 412. In another example, the fitness function may attempt to optimize the location of the master node 402 so that the master node 402 is closest to a particular computing resource associated with the data replication group 412 but also outside of the same fault zone as the particular computing resources associated with the data replication group 412. The fitness function may include various functions and algorithms such as Ackley's function, sphere function, Goldstein-Price function, Eggholder function, Kursawe function, Binh and Korn function, Viennet function, Poloni's two-objective function, polynomial models, regression models, neural networks, machine learning, support vector machines, or other algorithm and/or function to determine an optimal placement of a master node 402 among the set of nodes 404 of the data replication group 412.

The nodes 404 of the data replication group 412 utilize the fitness score during one or more operations to elect and/or assign the master node 402. Furthermore, the fitness score and election of the master node 402 may be an optimization of the consensus protocol executed by the data replication group 412 and, as such, the nodes 404 of the data replication group may operate without the score information and/or without the presence of the master node 402. For example, if the fitness score information is unavailable, the nodes 404 of the data replication group 412 may execute the consensus protocol without assigning the role of master node 402. Various election procedures may be implemented in accordance with the present disclosure. For example, when receiving a request from a node 404 to be elected and/or assigned the role of master node 402, the node 404 may only accept the request if the fitness score of the requestor is higher than the fitness score of the node 404. In another example, when a process to elect a leader is started, the nodes 404 will wait an interval of time inversely proportionate to the node's 404 fitness score (e.g., the lower the score the longer the node will wait) before transmitting a request to the elected and/or assigned the role of master node 402.

The data replication group 412 may further include software or other executable code that, when executed by one or more processors, causes the computer systems executing the code to manage the operation of the data replication group 412, nodes 404, and/or master node 402. Managing the operation of the data replication group 412 may include creating new nodes, replacing failed nodes 404, providing discovery of nodes, backing up data maintained by the nodes 404, determining roles of the consensus protocol to be performed by the nodes 404, selecting a master node 402, and other such operations as required to ensure the functioning of the data replication group 412. In various embodiments, the master node 402 executes the leader role, as described above, of the Paxos consensus protocol. Furthermore, the master node 402 may ensure progress towards eventually consistent data storage and reads from the various nodes of the data replication groups 412. The data replication group 412, illustrated in FIG. 4, may be used in connection with various embodiments described herein. For example, the data replication group 412 may be a member of a pool of data replication groups described above in connection with FIG. 2. Additionally, the data replication group 412 may be initialized with a certain number of nodes 404 and may increase the number of nodes 404 over an interval of time until a desired number of nodes is reached.

Figure 5:
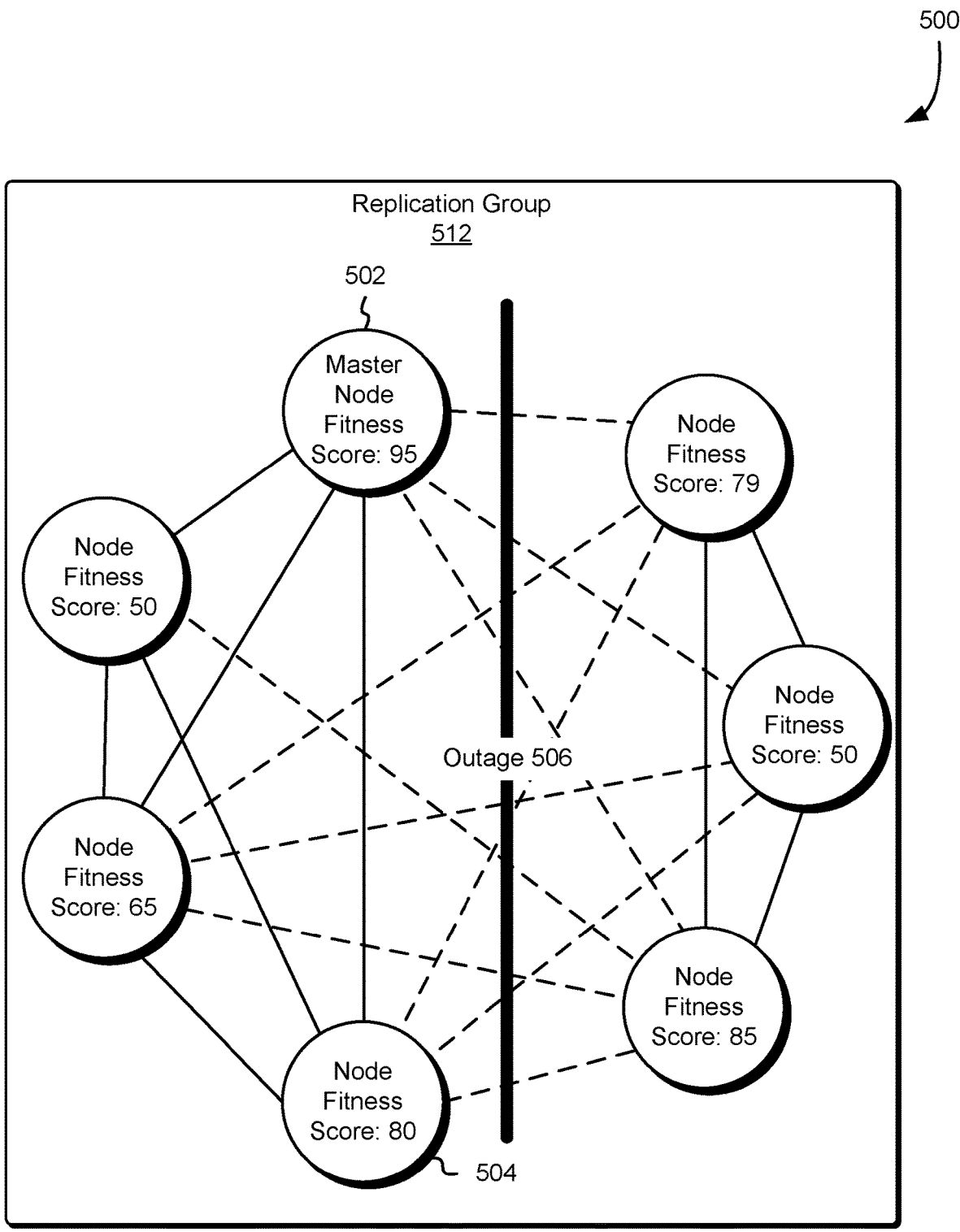
FIG. 5 illustrates an environment in which nodes of a data replication group determine a new master node as a result of an outage in accordance with an embodiment.

FIG. 5 illustrates an environment 500 in which a data replication group 512 may implement a consensus protocol between one or more nodes 504 in accordance with at least one embodiment. In addition, at least one node 504 of the data replication group 512 may be a master node 502. Each node 504, including the master node 502, may be software or other executable code maintained in the memory of a physical host or other server computer system and executed by the physical host or other server computer system in order to provide the functionality described herein. Furthermore, the nodes 504 and master node 502 may be executed by one or more distinct physical hosts or other server computer systems. For example, two nodes 504 of the data replication group 512 may be executed by a first physical host and the remaining nodes 504, including the master node 502, of the data replication group 512 may be executed by a second physical host. The physical hosts may include a variety of computing resources such as the server computer systems described above in connection with FIG. 3.

Furthermore as illustrated in FIG. 5, the nodes 504 of the data replication group 512 may experience or otherwise be affected by an outage 506. The outage may include any number of events that may cause one or more nodes 504 of the data replication group 512 to be inaccessible. For example, the outage 506 may include loss of power to one or more computing resources and/or data centers, network error, server error, computer crash, software error, failure of one or more computing resources, or any other event that causes a node 504 to be inoperable or inaccessible. As illustrated in FIG. 5, when the outage 506 occurs the three nodes 504 of the data replication group 512 become inaccessible to the remaining four nodes 504 in the data replication group 512 (indicated in FIG. 5 by the dashed lines). In the example illustrated in FIG. 5, the remaining four nodes 504, including the master node 502, may continue execution of the consensus protocol as a result of a quorum of the nodes 504 and the master node 502 remaining in communication. In various embodiments, once the three nodes 504 are no longer affected by the outage 506, they may initiate learning operations described in greater detail below in connection with FIG. 8.

Figure 6:
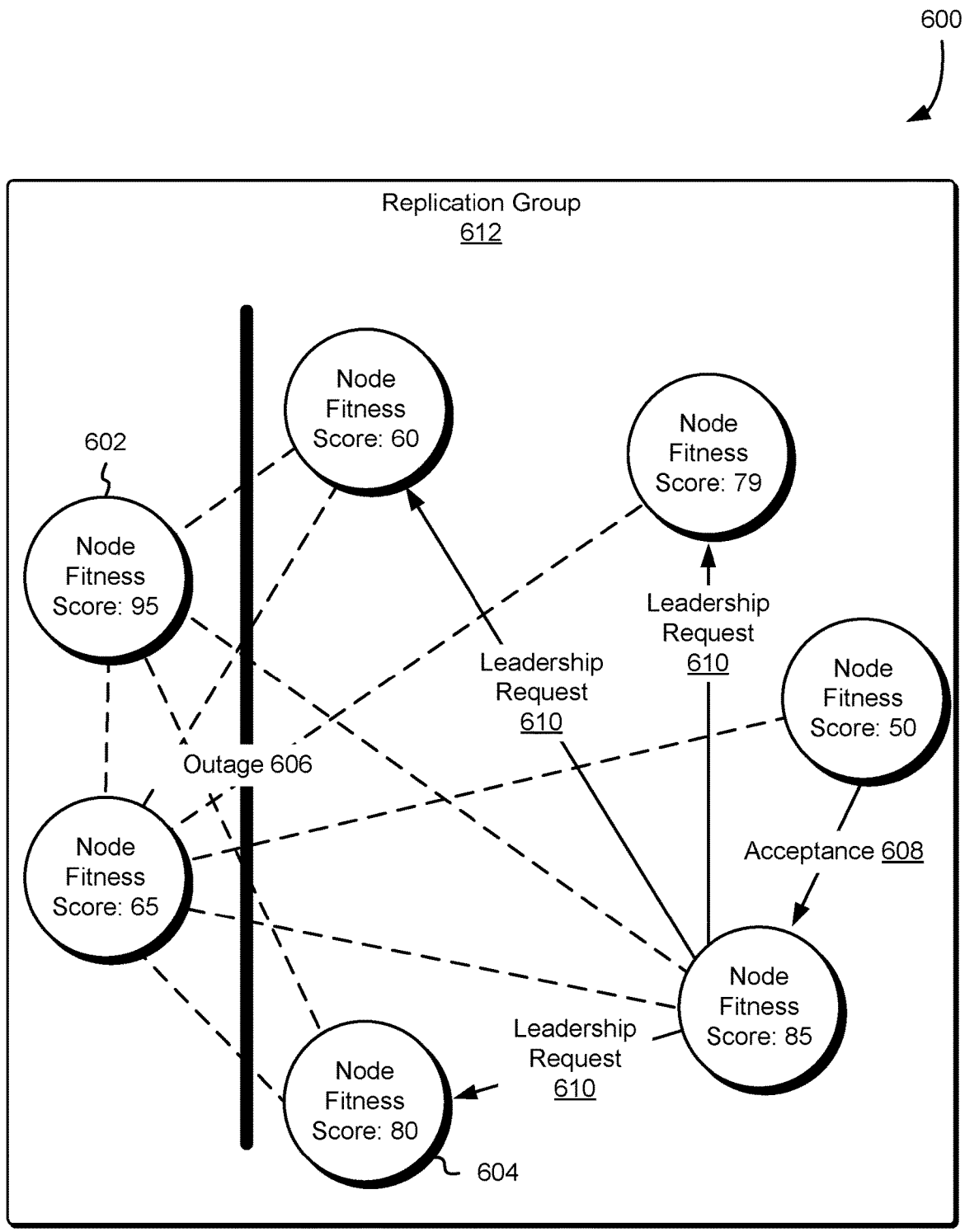
FIG. 6 illustrates an environment in which nodes of a data replication group determine a new master node as a result of an outage in accordance with an embodiment.

FIG. 6 illustrates an environment 600 in which a data replication group 612 may implement a consensus protocol between one or more nodes 604 in accordance with at least one embodiment. In addition, at least one node 604 of the data replication group 612 may be a master node 602. Each node 604, including the master node 602, may be software or other executable code maintained in the memory of a physical host or other server computer system and executed by the physical host or other server computer system in order to provide the functionality described herein. Furthermore, the nodes 604 and master node 602 may be executed by one or more distinct physical hosts or other server computer systems. For example, two nodes 604 of the data replication group 612 may be executed by a first physical host and the remaining nodes 604, including the master node 602, of the data replication group 612 may be executed by a second physical host. The physical hosts may include a variety of computing resources such as the server computer systems described above in connection with FIG. 3.

Furthermore as illustrated in FIG. 6, the nodes 604 of the data replication group 612 may experience or otherwise be affected by an outage 606. The outage may include any number of events that may cause one or more nodes 604, including the master node 602, of the data replication group 612 to be inaccessible. For example, the outage 606 may include loss of power to one or more computing resources and/or data centers, network error, server error, computer crash, software error, maintenance of one or more computing resources, failure of one or more computing resources, or any other event that causes a node 604 to be inoperable or inaccessible. As illustrated in FIG. 6, when the outage 606 occurs the two nodes 604, including the master node 602, of the data replication group 612 become inaccessible to the remaining five nodes in the data replication group 612

(indicated in FIG. 6 by the dashed lines). In the example illustrated in FIG. 6, the remaining five nodes may continue execution of the consensus protocol as a result of a quorum of the nodes 604 remaining in communication. This may include the election and/or assignment of a new master node 602.

In various embodiments, the master node 602 transmits a heartbeat message or other message to coordinate the activities of the data replication group and determine the health of the remaining nodes 604. As described in greater detail below, if no heartbeat message is received by a particular node within an interval of time, the particular node may initiate operations to elect and/or assign a new master node 602. A particular node, based at least in part on the fitness score or other leadership and/or fitness information, may then attempt to be elected and/or assigned the role of master node 602. The particular node may transmit one or more leadership requests 610. The leadership request 610 may include a variety of information such as identification of the node 604 responsible for transmitting the request, a fitness score of the node 604, state information of the node 604 or the data replication group 612, or any other information to enable the receiver to determine whether to accept 608 the leadership request 610. In various embodiments, a particular node receiving the leadership request 610 may transmit a request to the placement system as described above for leadership and/or fitness information.

As illustrated in FIG. 6, the outage 606 may cause the master node 602 to become inaccessible to a quorum of nodes 604 of the data replication group 612. In various embodiments, once the outage 606 is no longer affecting the master node 602 and the quorum of nodes 604 have elected a new master node, the master node 602 may attempt to be re-assigned the role of master node. This may increase the performance of the data replication group 612 as the master node 602 prior to the outage 606 may have had a higher fitness score than the new master node. However, in some situations, it may not be advantageous to replace the newly-elected master node. For example, if the fitness score of the master node 602 is only marginally better than the fitness score of the new master node, then it may not improve the performance and efficiency of the data replication group 612, or the process of re-electing the master node 602 may cost more than the performance and efficiency increase that may be gained. In such scenarios, the leadership and/or fitness information may include a degree or confidence score indicating a difference or magnitude of difference between fitness scores required before taking such action. For example, this information may indicate that the master node 602 may only be re-elected if the difference between the master node's 602 fitness score and the new master node's fitness score is above a threshold.

Figure 7:
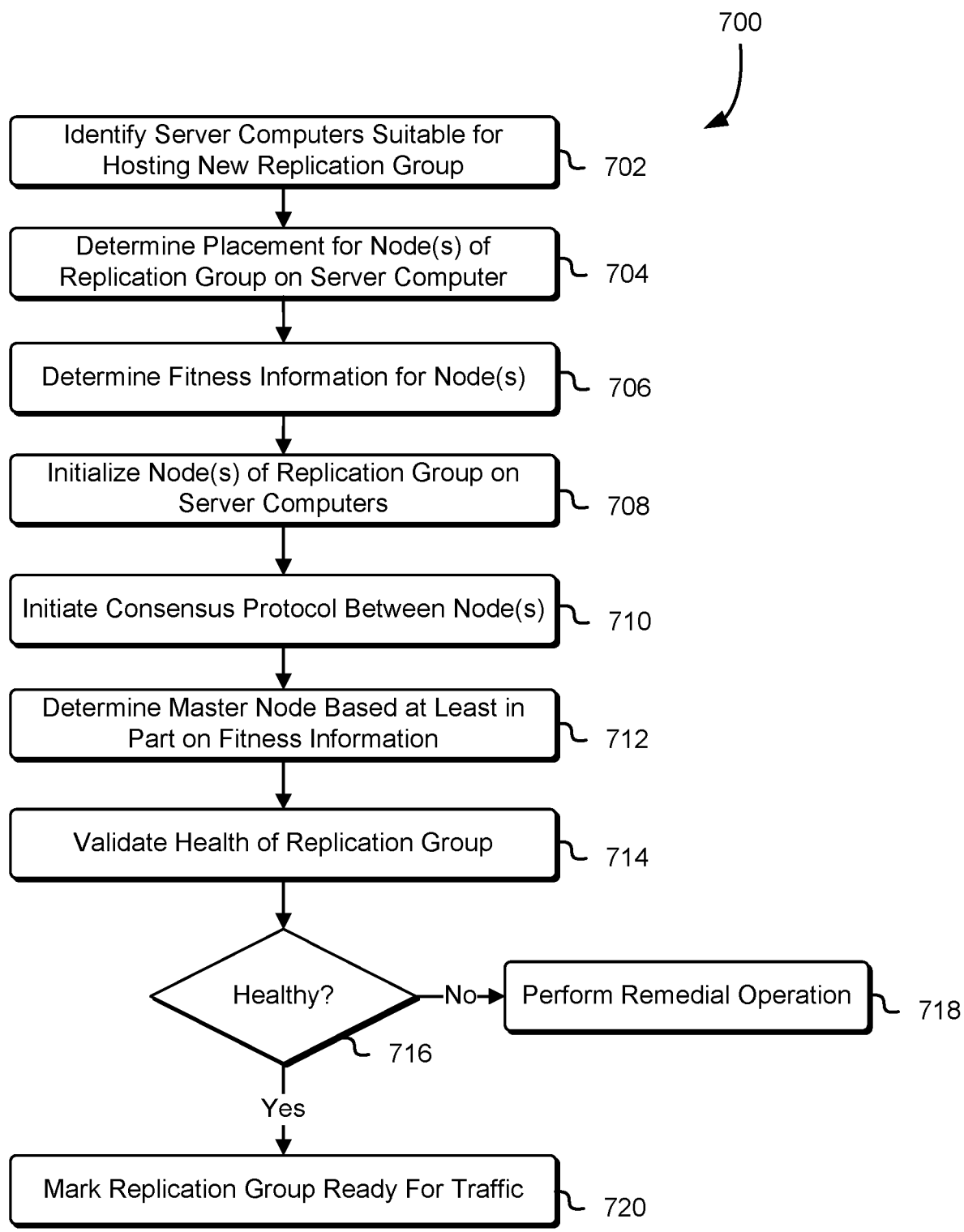
FIG. 7 shows an illustrative process which may be used to create a data replication group including fitness information in accordance with at least one embodiment.

FIG. 7 is a block diagram illustrating an example of a process 700 for provisioning a data replication group consisting of one or more nodes in accordance with at least one embodiment. The process 700 may be performed by any suitable system such as a management system of a replication group service as described above in connection with FIGS. 2 and 3. The process 700 includes identifying one or more server computer systems suitable for hosting a new replication group 702. The one or more server computer systems suitable for hosting one or more new nodes of an existing data replication group may also be identified. As described above in, the replication group service or component thereof, such as the management system, may query a placement system to identify suitable server computer systems for placement of the new data replication group, new nodes of the data replication group, and location information for a master node of the data replication group. The process 700 may be initiated in response to a variety of request and/or events, for example, the process 700 may be initiated to replace a node of a data replication group after one or more nodes of the data replication group have failed. In another example, the process 700 may be initiated to replace a data replication group that has been removed from a pool of data replication groups or during the process of creating a pool of data replication groups.

In step 704, the management system or other system executing the process 700 may determine the placement of nodes of the data replication group on the identified one or more server computer systems suitable for hosting the one or more nodes of the data replication group. The management system may evaluate the set of identified server computer systems based at least in part on one or more constraints on placement. For example, a particular server computer may be limited to hosting a certain number of nodes of the data replication group. The management system may then query the placement system to determine fitness information for the nodes 706. The fitness information may be based at least in part on the determined placement of the nodes, the placement of other computing resources in a distributed computing environment, the location of a customer associated with the data replication group, the location of the node relative to one another, or any other attribute that may have an influence on performance and efficiency of the data replication group. As described above, the fitness score may be determine by using a fitness function or similar algorithm to optimize one or more objectives.

In step 708, once the set of server computer systems has been identified, the system performing the process 700 may initialize one or more nodes of the data replication group on the server computer systems. Initializing the one or more nodes may include transmitting a placement request to a virtualization layer or other component of the server computer systems as described above. The nodes may be configured such that, once initialized, the nodes commence the consensus protocol between the nodes of the data replication group 710. The node may commence the consensus protocol automatically or may commence the consensus protocol as a result of receiving a command or other request. If the node is the first and/or only member of the data replication group, the node may implement the consensus protocol with itself.

In step 712, the nodes of the data replication group may determine a master node based at least in part on fitness information. The fitness information may be provided by the placement system as described above. Furthermore, the fitness information may indicate a variety of leadership and/or fitness information as described herein. For example, the fitness information may indicate an order in which the various nodes are to attempt to be elected the master node. In another example, the fitness information may indicate a delay or time interval after which the various nodes may attempt to be elected the master node. As described above, in order to be elected and/or assigned the role of master node, a particular node's requests to be elected and/or assigned the role of master node must be accepted by a quorum of nodes of the data replication group.

As a result of executing the consensus protocol, the node may validate the health of the data replication group 714. For example, the nodes may, as a part of the consensus protocol, exchange heartbeat messages or other messages confirming the health of the member of the data replication group. In numerous variations of the process 700, the system performing the process 700 may also validate the health of the data replication group either in addition to the operation of the consensus protocol or as an alternative.

If a sufficient number of nodes of the data replication group are healthy 716 the system performing the process 700 may mark the replication group as "ready" to receive traffic 720. Marking the data replication group as healthy may indicate that at least a sufficient number of the nodes are operating such that the consensus protocol may be executed and the data replication group may durably store data. For example, if the data replication group is executing the Paxos consensus protocol, the data replication group may be healthy if a quorum of the nodes, including a master node, has been validated successfully (e.g., are successfully implementing the Paxos consensus protocol). In numerous variations of the process 700, the system performing the process 700 may require that a greater number of the nodes are validated before marking the replication group as ready. For example, the system performing the process 700 may require all the nodes of a new data replication group be validated prior to enabling the new data replication group to receive traffic. Alternatively, if an insufficient number of nodes of the data replication group are healthy, the system performing the process 700 may perform remedial operations 718. Remedial operations may include terminating the data replication group, generating a new data replication group, initializing replacement nodes of any node which failed to validate, terminating any node which failed to validate, or other remedial operation as suitable for generating a data replication group.

Figure 8:
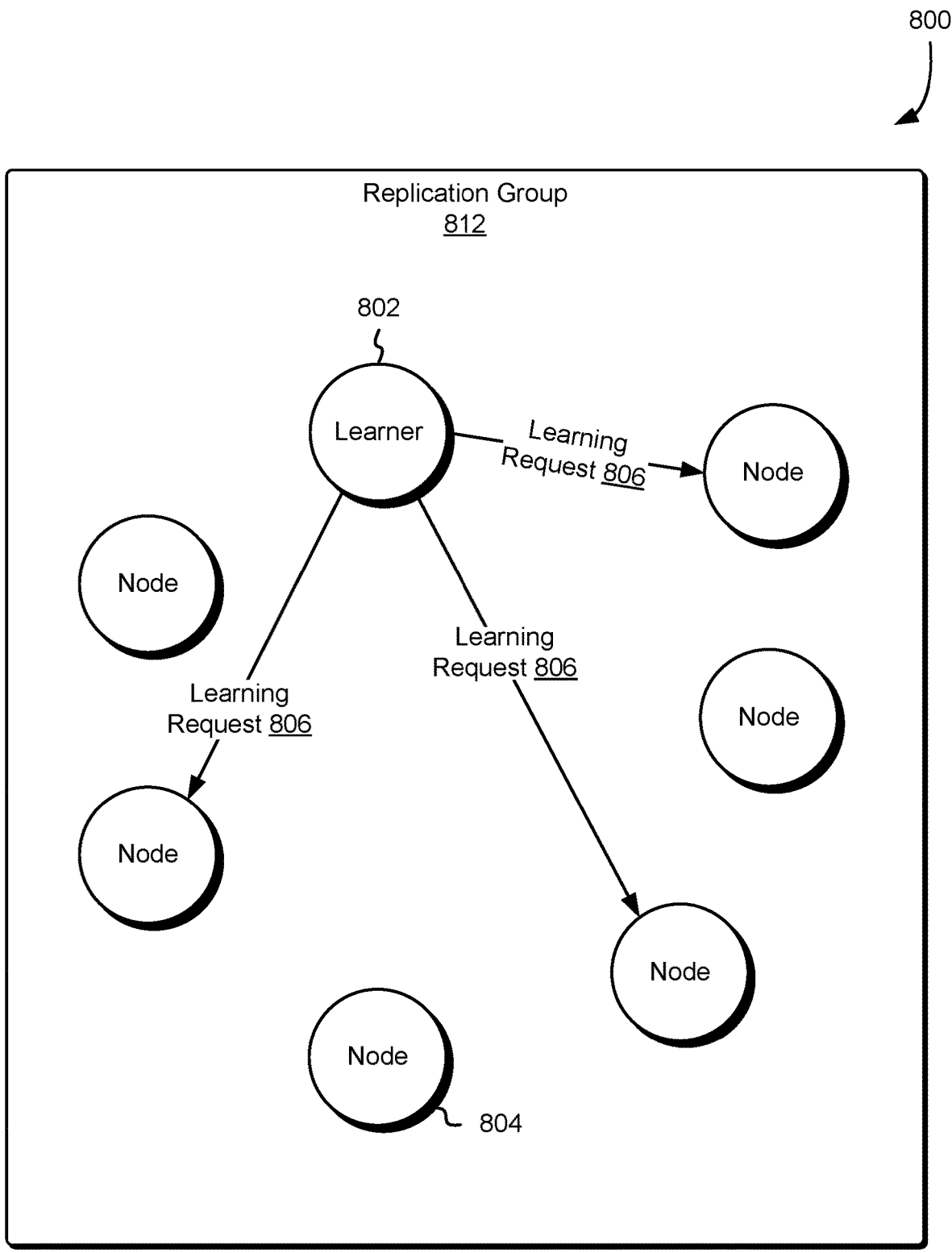
FIG. 8 illustrates an environment in which a set of nodes of a data replication group may be configured to execute a catchup algorithm in accordance with at least one embodiment.

FIG. 8 illustrates an environment 800 in which a data replication group 812 may implement a catchup algorithm of a consensus protocol between one or more nodes 804 of a data replication group 812 in accordance with at least one embodiment. In addition, at least one node 804 of the data replication group 812 may be a learner 802. The learner 802 may be a node of the data replication group 812 that has determined that state of the node is stale or otherwise behind the state of other nodes 804 of the group and execution of a catchup algorithm is required to match the current state of the data replication group 812. Each node 804, including the learner 802, may be software or other executable code maintained in the memory of a physical host or other server computer system and executed by the physical host or other server computer system in order to provide the functionality described herein. Furthermore, the nodes 804 and learner 802 may be executed by one or more distinct physical hosts or other server computer systems. For example, two nodes 804 of the data replication group 812 may be executed by a first physical host and the remaining nodes 804, including the learner 802, of the data replication group 812 and may be executed by a second physical host. The physical hosts are described in greater detail below.

The nodes 804 and learner 802 of the data replication group 812 may be connected through various network connections. The network connection may be provided by various network devices, physical hosts, and other computer systems. For example, the physical hosts executing the nodes may include at least a virtualization layer and a network interface to enable the nodes to send and receive network traffic. Furthermore, the nodes 804 and learner 802 may be distributed across physical hosts and networks such that failure of one or more networks or physical hosts does not cause all of the nodes 804 of the data replication group 812 to fail. Although six nodes 804 and one learner 802 are illustrated in FIG. 8, any number of nodes 804 and learners 802 may be included in the data replication group 812 and distributed across a plurality of distributed computer systems in accordance with the present disclosure. For example, five nodes 804 of the data replication group illustrated in FIG. 8 may be a learner executing a catchup algorithm. In addition, the data replication group may include a master node as described above (not shown in FIG. 8 for simplicity).

The data replication group 812 may further include software or other executable code configured to manage the operation of the data replication group 812, nodes 804, and/or learner 802. Managing the operation of the data replication group 812 may include creating new nodes 804, replacing failed nodes 804, providing discovery of nodes, backing up data maintained by the nodes 804, determining roles of the consensus protocol to be performed by the nodes 804, executing a catchup algorithm, and such other operations as required to ensure the functioning of the data replication group 812. The data replication group 812, illustrated in FIG. 8, may be used in connection with various embodiments described herein. For example, the data replication group 812 may be a member of a pool of data replication groups described above in connection with FIG. 1. In various embodiments, the learner 802 may determine staleness based at least in part on receipt of a heartbeat operation from the master node or other node of the data replication group. For example, the data replication group may be configured such that the master node transmits a heartbeat message every 2 milliseconds to ensure communication between the nodes. Therefore, if a node does not receive a heartbeat message at the expiration of an interval of time the node may execute a catchup algorithm to determine if the node is stale.

The learner, as illustrated in FIG. 8, may execute an unsupervised catchup algorithm. For each learner 802 of the data replication group 812, the learner may initialize a set of nodes 804 to learn from. The set of nodes 804 to learn from may include the original members of the data replication group 812 or may include an updated membership of the data replication group based at least in part on information included in the log. If the learner is a new node and does not have membership information the learner may determine the membership information and include the membership information in the set of nodes 804 to learn from. The learner 802 may then randomly or pseudorandomly select a particular node from the set of nodes 804 to learn from. The learner may then transmit a learning request 806 to the selected node.

The learner 802 may then receive, in response to the learning request 806 from the selected node, a log or other information from the node that may enable the learner 802 to copy and/or replicate the state of the selected node. In various embodiments, the logs of the nodes 804 may have been trimmed or otherwise deleted in order to reduce the amount of computing resources used by the nodes 804; in such cases, the learner 802 may simply copy the state of the node (e.g., obtain a snapshot of the node and copy the snapshot over to the memory of the learner 802). After copying the state of the selected node the learner 802 may continue the catchup algorithm. For example, the learner 802 may select another node from the set of nodes 804 to learn from. In various embodiments, the unsupervised catchup algorithm may include a round-robin element. Specifically, the learner 802 may remove the selected node from the set of nodes 804 which may be learned from. The learner 802 may continue to transmit learning requests and check for staleness until the learner 802 has determined that the state of the learner 802 matches the state of the data replication group 812. Other catchup and/or learning algorithms may be used in accordance with the present disclosure, such as a random learner, designated learner, hierarchical learner, circular learner, full learner, or other suitable learning algorithm.

Figure 9:
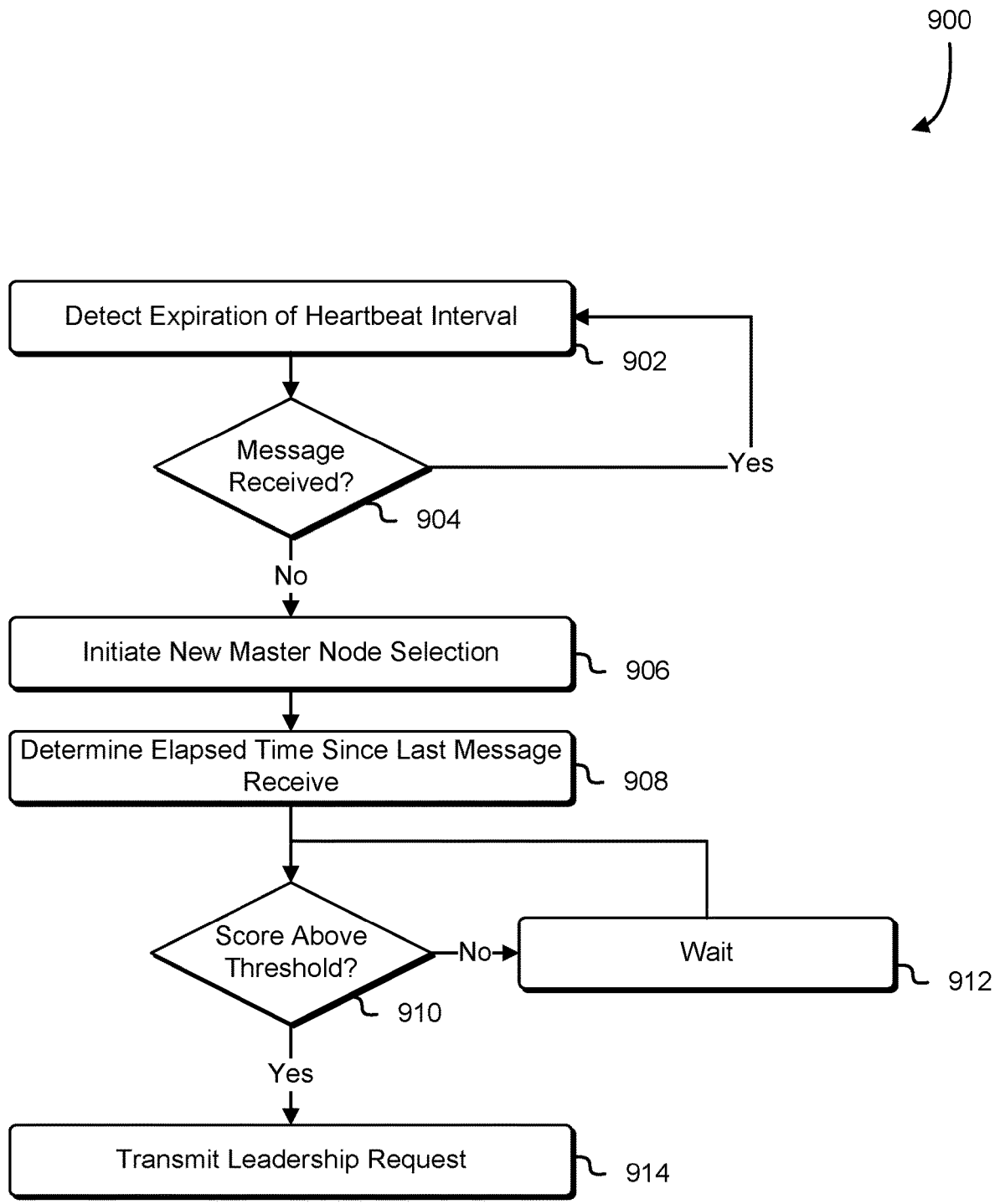
FIG. 9 shows an illustrative process which may be used to determine a new master node as a result of an outage in accordance with an embodiment.

FIG. 9 is a block diagram illustrating an example of a process 900 for determining a master node from a set of nodes of a data replication group in accordance with at least one embodiment. The process 900 may be performed by any suitable system such as various nodes of the data replication group as described above in connection with FIGS. 4-6. The process 900 includes detecting the expiration of a heartbeat interval 902. For example, the data replication group may be configured such that the master node transmits a heartbeat message every two seconds to ensure communication between the nodes.

In step 904, the node may determine if one or more messages have been received from other nodes of the data replication group. For example, if the node does not receive a heartbeat message at the expiration of an interval of time, the node may determine that the master node is inaccessible or there has been an outage as described above. In another example, the node may receive messages from a subset of nodes of the set of nodes of the data replication group and determine the current status and membership of the data replication group based at least in part on the received messages. If a heartbeat message has been received, the system executing the process 900 may return to step 902 and await the expiration of the heartbeat interval again. However, if no heartbeat message or other message has been received during the interval, the node may then initiate new master node selection 906.

In step 908, the node may determine an elapsed time since the last heartbeat message or other message from the master node has been received. The elapsed time may be used to determine whether the node should transmit a leadership request. For example, if the fitness score of the node executing the process 900 is above a threshold 910, this indicates the node's fitness score is sufficient to be elected and/or assigned the role of new master node. If the score is below the threshold, the node executing the process 900 may wait 912. The node may be required to wait if the node's fitness score is below the threshold and therefore indicative that the node does not, at least currently, satisfy the requirement to be elected and/or assigned the role of new master node. As described above, the fitness score may indicate a duration of time a particular node is required to wait before the node can transmit a leadership request. For example, a fitness score between 90 and 100 may indicate no wait time for a particular node but a fitness score between 80-89 may indicate a wait time of two second (e.g., one heartbeat message interval) for the particular node. In this manner, nodes with a higher fitness score may be provided with the opportunity to be elected and/or assigned the role of new master node before various other nodes in the data replication group with a lower fitness score.

In step 914, if the score is above the threshold the node executing the process 900 may transmit a leadership request. The leadership request may include various requests as described herein including the requests described above in connection with FIGS. 5 and 6. The leadership requests if accepted by a quorum of the nodes of the data replication group may cause the node responsible for the leadership requests to be assigned the role of new master node. In numerous variations of the process 900, if the node executing the process 900 receives a heartbeat message or a leadership request during the execution of the process 900, the node may terminate the execution of the process. For example, if a node with a higher fitness score transmits a leadership request prior to the node executing the process 900 transmits a leadership request and is received by the node executing the process 900, the node executing the process 900 may accept the leadership request and terminate the process 900. In another example, the node executing the process 900 initiates new master node selection but then receives a heartbeat message (e.g., the message was delayed in transit) the node executing the process 900 may terminate the process 900.

Figure 10:
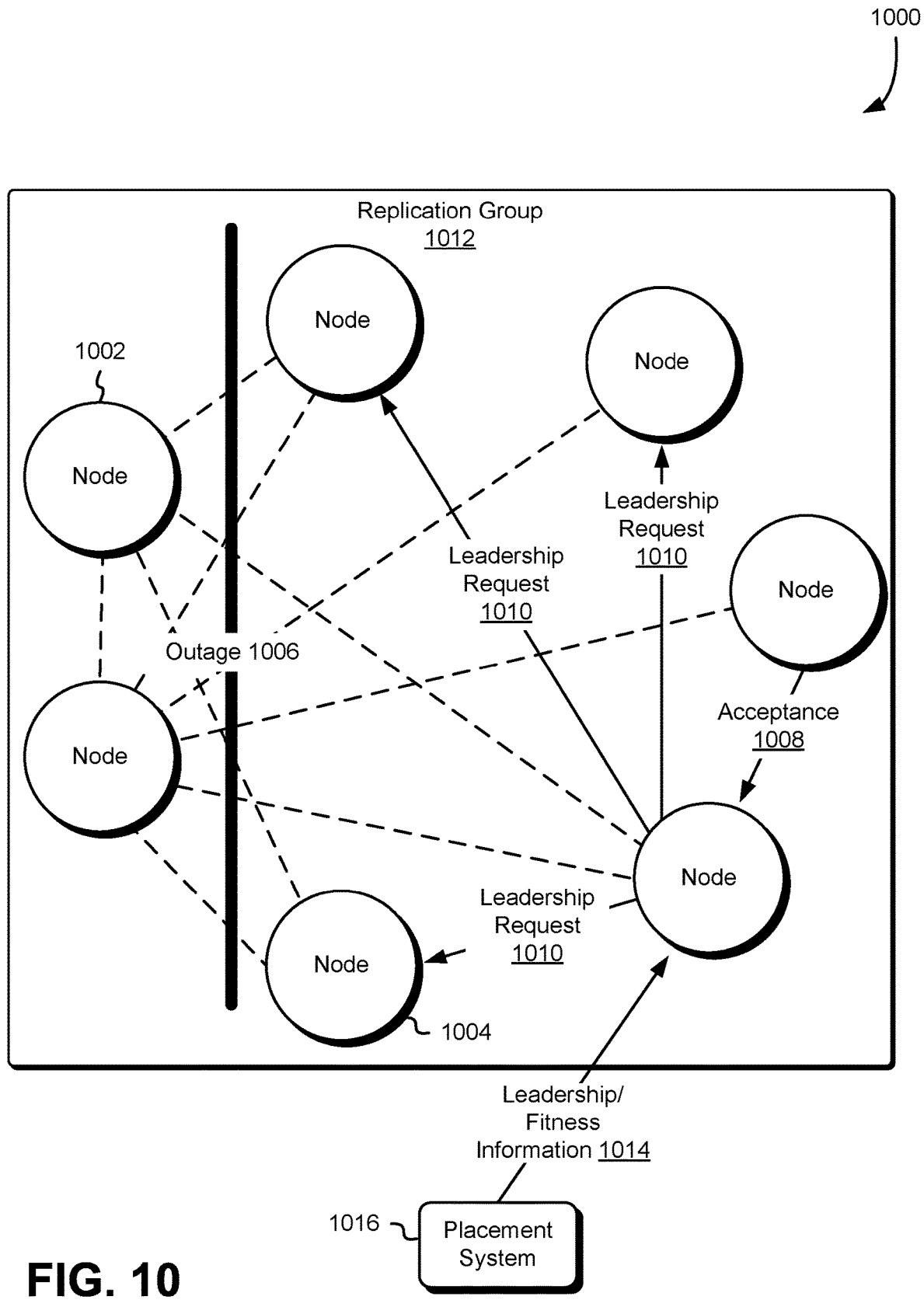
FIG. 10 illustrates an environment in which nodes of a data replication group determine a new master node as a result of an outage in accordance with an embodiment.

FIG. 10 illustrates an environment 1000 in which a data replication group 1012 may implement a consensus protocol between one or more nodes 1004 in accordance with at least one embodiment. In addition, at least one node of the data replication group 1012 may be a master node 1002. Each node 1004, including the master node 1002, may be software or other executable code maintained in the memory of a physical host or other server computer system and executed by the physical host or other server computer system in order to provide the functionality described herein. Furthermore, the nodes 1004 and master node 1002 may be executed by one or more distinct physical hosts or other server computer systems. For example, two nodes of the data replication group 1012 may be executed by a first physical host and the remaining nodes, including the master node 1002, of the data replication group 1012 may be executed by a second physical host. The physical hosts may include a variety of computing resources such as the server computer systems described above in connection with FIG. 3.

Furthermore as illustrated in FIG. 10, the nodes 1004 of the data replication group 1012 may experience or otherwise be affected by an outage 1006. The outage may include any number of events that may cause one or more nodes 1004, including the master node 1002, of the data replication group 1012 to be inaccessible. For example, the outage 1006 may include loss of power to one or more computing resources and/or data centers, network error, server error, computer crash, software error, maintenance of one or more computing resources, failure of one or more computing resources, or any other event that causes a node 604 to be inoperable or inaccessible. As illustrated in FIG. 10, when the outage 1006 occurs, various nodes, including the master node 1002, of the data replication group 1012 become inaccessible to the remaining nodes in the data replication group 1012 (indicated in FIG. 10 by the dashed lines). In the example illustrated in FIG. 10, the remaining five nodes may continue execution of the consensus protocol as a result of a quorum of the nodes remaining in communication. This may include the election and/or assignment of a new master node.

As described in numerous examples above, the master node 1002 transmits a heartbeat message or other message to coordinate the activities of the data replication group 1012. If no heartbeat message is received by a particular node within an interval of time, the particular node may initiate operations to elect and/or assign a new master node. The particular node may, as illustrated in FIG. 10, obtain leadership and/or fitness information 1014 from a placement system 1016. The placement system 1016 may be a process or application executed by a host computer system. In addition, the placement system 1016 may monitor and determine the placement of nodes 1004 and data replication groups 1012 in a distributed computing environment as described in greater detail above. The placement system 1016 may provide the leadership and/or fitness information 1014 in response to a request from a particular node. in response to detecting the outage 1006, in response to one or more nodes of the data replication group 1012 becoming inaccessible, in response to a failure of one or more nodes of the data replication group, or in response to other events associated with the execution of the data replication group 1012.

The particular node may transmit one or more leadership requests 1010, as described above, based at least in part on the leadership and/or fitness information 1014. In addition, one or more other nodes may transmit an acceptance 1008, as described above, based at least in part on receiving the one or more leadership requests 1010. In various embodiments, the one or more nodes transmit the acceptance 1008 based at least in part on leadership and/or fitness information 1014 information included in the one or more leadership requests 1010 (e.g., the leadership and/or fitness information 1014 obtained by the particular node from the placement system 1016) or leadership and/or fitness information 1014 obtained by the one or more nodes directly from the placement system 1016.

In various embodiments, the placement system 1016 determines the leadership and/or fitness information 1014 in response to a modification or other change to the computing resources in the distributed computing environment. For example, a particular virtual computing resource supported by the data replication group 1012 is migrated to a new physical host. In such embodiments, the leadership and/or fitness information 1014 may be considered additional or new leadership and/or fitness information. The nodes 1004 may receive the additional leadership and/or fitness information and determine whether to select a new master node. If the additional leadership and/or fitness information indicates that performance of the data replication group 1012 will increase and the increase is above a certain threshold the nodes 1004 of the data replication group may initiate a process to select a new master node based at least in part on the additional leadership and/or fitness information.

Figure 11:
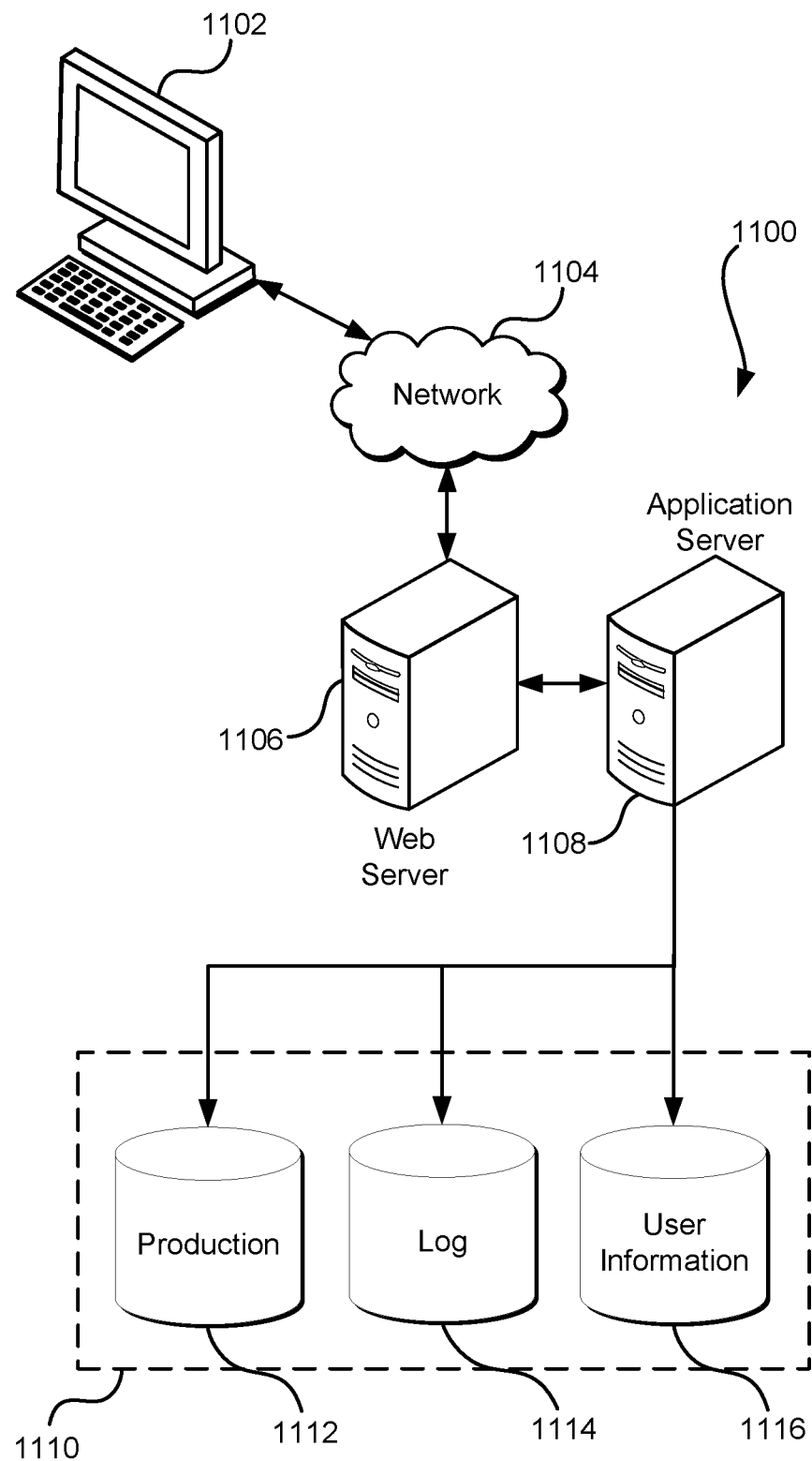
FIG. 11 illustrates an environment in which various embodiments can be implemented.

FIG. 11 illustrates aspects of an example environment 1100 for implementing aspects in accordance with various embodiments. As will be appreciated, although a web-based environment is used for purposes of explanation, different environments may be used, as appropriate, to implement various embodiments. The environment includes an electronic client device 1102, which can include any appropriate device operable to send and/or receive requests, messages, or information over an appropriate network 1104 and, in some embodiments, convey information back to a user of the device. Examples of such client devices include personal computers, cell phones, handheld messaging devices, laptop computers, tablet computers, set-top boxes, personal data assistants, embedded computer systems, electronic book readers, and the like. The network can include any appropriate network, including an intranet, the Internet, a cellular network, a local area network, a satellite network or any other such network and/or combination thereof. Components used for such a system can depend at least in part upon the type of network and/or environment selected. Many protocols and components for communicating via such a network are well known and will not be discussed herein in detail. Communication over the network can be enabled by wired or wireless connections and combinations thereof. In this example, the network includes the Internet and/or other publicly-addressable communications network, as the environment includes a web server 1106 for receiving requests and serving content in response thereto, although for other networks an alternative device serving a similar purpose could be used as would be apparent to one of ordinary skill in the art.

The illustrative environment includes at least one application server 1108 and a data store 1110. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS"), JavaScript Object Notation (JSON), and/or another appropriate client-side structured language. Content transferred to a client device may be processed by the client device to provide the content in one or more forms including, but not limited to, forms that are perceptible to the user audibly, visually and/or through other senses. The handling of all requests and responses, as well as the delivery of content between the client device 1102 and the application server 1108, can be handled by the web server using PHP: Hypertext Preprocessor ("PHP"), Python, Ruby, Perl, Java, HTML, XML, JSON, and/or another appropriate server-side structured language in this example. Further, operations described herein as being performed by a single device may, unless otherwise clear from context, be performed collectively by multiple devices, which may form a distributed and/or virtual system.

The data store 1110 can include several separate data tables, databases, data documents, dynamic data storage schemes and/or other data storage mechanisms and media for storing data relating to a particular aspect of the present disclosure. For example, the data store illustrated may include mechanisms for storing production data 1112 and user information 1116, which can be used to serve content for the production side. The data store also is shown to include a mechanism for storing log data 1114, which can be used for reporting, analysis or other such purposes. It should be understood that there can be many other aspects that may need to be stored in the data store, such as page image information and access rights information, which can be stored in any of the above listed mechanisms as appropriate or in additional mechanisms in the data store 1110. The data store 1110 is operable, through logic associated therewith, to receive instructions from the application server 1108 and obtain, update or otherwise process data in response thereto. The application server 1108 may provide static, dynamic, or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 1102. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed (i.e., as a result of being executed) by a processor of the server, allow the server to perform its intended functions.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 11. Thus, the depiction of the system 1100 in FIG. 11 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network, and any combination thereof. In some embodiments, connection-oriented protocols may be used to communicate between network endpoints. Connection-oriented protocols (sometimes called connection-based protocols) are capable of transmitting data in an ordered stream. Connection-oriented protocols can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers, and business application servers. The server(s) also may be capable of executing programs or scripts in response to requests from user devices, such as by executing one or more web applications that may be implemented as one or more scripts or programs written in any programming language, such as Java®, C, C # or C++, or any scripting language, such as Ruby, PHP, Perl, Python or TCL, as well as combinations thereof. The server(s) may also include database servers, including without limitation those commercially available from Oracle®, Microsoft®, Sybase®, and IBM as well as open-source servers such as MySQL, Postgres, SQLite, MongoDB, and any other server capable of storing, retrieving, and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or web browser. In addition, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some embodiments, the code is stored on set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media may comprise multiple non-transitory computer-readable storage media and one or more of individual non-transitory storage media of the multiple non-transitory computer-readable storage media may lack all of the code while the multiple non-transitory computer-readable storage media collectively store all of the code.

Accordingly, in some examples, computer systems are configured to implement one or more services that singly or collectively perform operations of processes described herein. Such computer systems may, for instance, be configured with applicable hardware and/or software that enable the performance of the operations. Further, computer systems that implement various embodiments of the present disclosure may, in some examples, be single devices and, in other examples, be distributed computer systems comprising multiple devices that operate differently such that the distributed computer system performs the operations described herein and such that a single device may not perform all operations.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
determining that a virtual machine instance attached to a storage volume supported by a data replication group has been migrated from a first physical server to a second physical server, the data replication group comprising a plurality of nodes;
determining, based at least in part on a distance of a particular node of the plurality of nodes from the second physical server, to migrate the particular node closer to the physical second server;
provisioning a new node on a host that is closer to the second physical server than the particular node;
replicating a state of the particular node to the new node;
adding the new node to the data replication group; and
removing the particular node from the data replication group.

2. The computer-implemented method of claim 1, wherein:
the storage volume comprises a plurality of replicas; and
the data replication group stores information indicating which of the replicas is a master replica to which the virtual machine instance attaches to access the storage volume.

3. The computer-implemented method of claim 1, further comprising causing election of a new master node for the data replication group.

4. The computer-implemented method of claim 3, wherein causing the election of the new master node causes the plurality of nodes to select the new master node in accordance with a consensus protocol such that an individual node of the plurality of nodes delays submitting a request to become the new master node based at least in part on individual fitness information of the individual node.

5. The computer-implemented method of claim 3, wherein causing the election of the new master node causes the plurality of nodes to elect the new master node based at least in part on a distance between the virtual machine instance and the new master node.

6. The computer-implemented method of claim 5, wherein causing the election of the new master node causes the plurality of nodes to elect the new master node such that the new master node is within a same fault zone as a quorum of the plurality of nodes.

7. A system, comprising:
one or more processors; and
memory including computer-executable instructions which, as a result of execution by the one or more processors, cause the system to:
determine that a computing resource attached to a volume supported by a data replication group comprising a plurality of nodes has been migrated to a host computer system; and
until specified criteria corresponding to the data replication group is met:
determine, based at least in part on locations of the plurality of nodes relative to the computing resource, a particular node of the plurality of nodes to migrate;
initialize a new node on the host computer system;
replicate a state of the particular node to the new node;
add the new node to the data replication group; and
remove the particular node from the data replication group.

8. The system of claim 7, wherein the specified criteria is an aggregate network distance between the computing resource and the plurality of nodes being at a value relative to a threshold.

9. The system of claim 7, wherein the plurality of nodes are distributed among a plurality of host computer systems.

10. The system of claim 7, wherein the computer-executable instructions further cause the system to initiate a new master node selection for the data replication group.

11. The system of claim 10, wherein the computer-executable instructions that cause the system to initiate the new master node selection further cause the system to select the new master node based at least in part on proximity of the new master node to the computing resource.

12. The system of claim 10, wherein:
the computer-executable instructions further cause the system to estimate an expected performance increase of the data replication group if the new node is made master node of the data replication group; and
the computer-executable instructions that cause the system to initiate the new master node selection further cause the system to cause the new node to be elected as the master node based at least in part on the expected performance increase.

13. The system of claim 7, wherein the computer-executable instructions include instructions that cause the system to initialize the new node on the host computer system further cause the system to:
select, based on a set of placement constraints, the host computer system from a plurality of host computer systems; and
transmit a placement request to the host computer system to place the new node.

14. The system of claim 13, wherein:
the computing resource is hosted by a different computer system from the host computer system; and
the set of placement constraints include a constraint on a physical distance between the host computer system and the different computer system.

15. A non-transitory computer-readable storage medium storing executable instructions which, as a result of being executed by one or more processors of a computer system, cause the computer system to at least:
upon migration of a virtual machine resource attached to a storage volume supported by a data replication group to a first physical host:

determine a particular node of a plurality of nodes of the data replication group to migrate closer to the virtual machine resource;

initialize a new node on a second physical host within a threshold distance of the first physical host;

copy a state of the particular node to the new node;

add the new node to the data replication group; and remove the particular node from the data replication group.

16. The non-transitory computer-readable storage medium of claim 15, wherein the threshold distance is measured as a number of network hops between the first physical host and the second physical host.

17. The non-transitory computer-readable storage medium of claim 15, wherein the plurality of nodes is distributed across a plurality of fault zones.

18. The non-transitory computer-readable storage medium of claim 17, wherein the plurality of nodes is distributed across the plurality of fault zones such that a quorum of the plurality of nodes remain in communication with the virtual machine resource upon a failure of any one of the plurality of fault zones.

19. The non-transitory computer-readable storage medium of claim 17, wherein the executable instructions further cause the computer system to, further upon the migration of the virtual machine resource, cause selection of a new master node of the data replication group.

20. The non-transitory computer-readable storage medium of claim 19, wherein:

the virtual machine resource is located in a first fault zone of the plurality of fault zones; and the new master node is selected at least in part due to its location in a second fault zone different from the first fault zone.

* * * * *